US011879408B2

(12) United States Patent
Dudar

(10) Patent No.: US 11,879,408 B2
(45) Date of Patent: Jan. 23, 2024

(54) METHOD AND SYSTEM FOR FUEL SYSTEM DIAGNOSTICS

(71) Applicant: Ford Global Technologies, LLC, Dearborn, MI (US)

(72) Inventor: Aed Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/658,061

(22) Filed: Apr. 5, 2022

(65) Prior Publication Data

US 2022/0228539 A1 Jul. 21, 2022

Related U.S. Application Data

(62) Division of application No. 17/119,795, filed on Dec. 11, 2020, now Pat. No. 11,333,095.

(51) Int. Cl.

| | |
|---|---|
| ***F02D 41/22*** | (2006.01) |
| ***F02D 41/00*** | (2006.01) |
| ***F02M 25/08*** | (2006.01) |

(52) U.S. Cl.

CPC ........... *F02D 41/22* (2013.01); *F02D 41/004* (2013.01); *F02M 25/089* (2013.01); *F02M 25/0836* (2013.01); *F02D 2041/225* (2013.01); *F02D 2200/0602* (2013.01)

(58) Field of Classification Search

CPC .................. F02D 41/22; F02D 41/004; F02D 2200/0602; F02D 2041/225; F02M 25/0836; F02M 25/089

See application file for complete search history.

(56) References Cited

U.S. PATENT DOCUMENTS

| | | | | |
|---|---|---|---|---|
| 4,951,642 | A | 8/1990 | Hashimoto et al. | |
| 5,027,780 | A * | 7/1991 | Uranishi | F02M 25/08 123/520 |
| 5,327,934 | A * | 7/1994 | Thompson | F02M 25/0872 141/59 |
| 5,456,236 | A * | 10/1995 | Wakashiro | F02M 25/0854 123/519 |
| 5,857,447 | A * | 1/1999 | Shinohara | F02M 25/0809 123/520 |
| 6,431,156 | B1 * | 8/2002 | Murakami | F02M 25/08 123/520 |
| 8,082,905 | B2 * | 12/2011 | Mai | F02M 25/089 123/518 |
| 9,388,775 | B2 * | 7/2016 | Bolger | F02M 25/0836 |
| 9,732,685 | B2 * | 8/2017 | Dudar | F02M 25/08 |
| 10,704,478 | B1 * | 7/2020 | Dudar | F02D 41/0035 |
| 10,961,937 | B2 * | 3/2021 | Dudar | F02D 41/0032 |
| 2006/0081224 | A1 * | 4/2006 | Spink | G05D 16/0663 123/519 |
| 2009/0007890 | A1 * | 1/2009 | Devries | F02M 25/089 123/520 |

(Continued)

*Primary Examiner* — Phutthiwat Wongwian
*Assistant Examiner* — Susan E Scharpf
(74) *Attorney, Agent, or Firm* — Vincent Mastrogiacomo; McCoy Russell LLP

(57) ABSTRACT

Methods and systems are provided for diagnostics of a fuel system configured with a three-way isolation valve and a four port canister. An example method includes, during a refueling event, indicating degradation of the three-way isolation valve based on pressure in the fuel tank during depressurization followed by refueling.

10 Claims, 9 Drawing Sheets

(56) References Cited

U.S. PATENT DOCUMENTS

| | | | | |
|---|---|---|---|---|
| 2011/0166765 | A1* | 7/2011 | DeBastos | B60K 15/03504 123/520 |
| 2011/0240145 | A1 | 10/2011 | Pifer | |
| 2014/0026992 | A1* | 1/2014 | Pearce | B60K 15/035 137/561 R |
| 2015/0101704 | A1* | 4/2015 | Leone | B67D 7/04 141/37 |
| 2015/0308389 | A1* | 10/2015 | Bolger | F02M 25/0836 137/12 |
| 2015/0369151 | A1* | 12/2015 | Dudar | F16K 21/18 141/94 |
| 2016/0298579 | A1* | 10/2016 | Peters | F02M 25/08 |
| 2017/0008390 | A1* | 1/2017 | Dudar | F02D 41/003 |
| 2017/0130659 | A1* | 5/2017 | Dudar | F02M 25/0836 |
| 2020/0189385 | A1* | 6/2020 | Dudar | B60K 15/03504 |
| 2020/0224598 | A1* | 7/2020 | Dudar | F02M 25/0836 |

* cited by examiner

METHOD AND SYSTEM FOR FUEL SYSTEM DIAGNOSTICS

CROSS REFERENCE TO RELATED APPLICATION

The present application is a divisional of U.S. Non-Provisional patent application Ser. No. 17/119,795, entitled "METHOD AND SYSTEM FOR FUEL SYSTEM DIAGNOSTICS", and filed on Dec. 11, 2020. The entire contents of the above-listed application are hereby incorporated by reference for all purposes.

FIELD

The present description relates generally to methods and systems for diagnostics of a fuel tank isolation valve in a non-integrated refueling canister only system.

BACKGROUND/SUMMARY

Vehicle fuel systems include evaporative emission control systems designed to reduce the release of fuel vapors to the atmosphere. For example, vaporized hydrocarbons (HCs) from a fuel tank may be stored in a fuel vapor canister packed with an adsorbent which adsorbs and stores the vapors. At a later time, when the engine is in operation, the evaporative emission control system allows the vapors to be purged into the engine intake manifold for use as fuel.

In a hybrid vehicle, the fuel vapors stored in the canister are primarily refueling vapors. In Non-Integrated refueling canister only systems (NIRCOS), the fuel tank is typically sealed via a closed FTIV except during refueling operations. The fuel vapors generated in the fuel tank from running loss and diurnal temperature cycles are therefore not be transferred into the fuel vapor canister and, instead, are contained within the fuel tank via the closed isolation valve. As a result, pressure may build in the fuel tank. When a vehicle operator indicates a demand to refuel the hybrid vehicle, a fuel cap may remain locked until venting of the fuel tank is allowed. In particular, the fuel cap is unlocked only after the tank is sufficiently depressurized, protecting the vehicle operator from being sprayed with fuel vapor.

Various approaches have been developed to expedite fuel tank depressurization. One example approach is shown by Pearce et al in US 2014/0026992. Therein, a vacuum pump is coupled to the outlet of a fuel vapor carbon canister. The vacuum pump is activated to increase air flow through the canister from the fuel tank when the fuel tank isolation valve is opened during refilling.

However, the inventors herein have recognized potential issues with such an approach. As one example, the need for a vacuum pump may increase component cost and complexity without significantly improving depressurization time. As another example, the battery operated vacuum pump may affect the fuel economy of a hybrid vehicle. In still other approaches, the isolation valve may be pulsed to vent the fuel tank pressure. This, however, may require the engine to be combusting fuel, and the same approach cannot be used for pressure control when a vehicle is propelled in an electric mode.

In order to reduce fuel tank depressurization time and to expedite unlocking of the fuel cap, a vehicle fuel system may include a fuel vapor canister having four ports, the canister coupled to a fuel tank via a three-way isolation valve. Typically, canisters have three ports: one for loading the canister, one for purging the canister, and one for venting the canister. A fourth port may be included in the canister at a location furthest away from the load port (and proximate the vent port) with sufficient activated carbon between the vent port and the fourth port to expedite the depressurization time. If the canister load is higher than a threshold at the time of refueling, canister depressurization can be performed by actuating the isolation valve to a first position where the fuel tank is depressurized by venting fuel vapors through the load port of the canister. If the canister load is lower than the threshold at the time of refueling, canister depressurization can be expedited by actuating the isolation valve to a second position where the fuel tank is depressurized by venting fuel vapors through the fourth port of the canister. Canister loading through the fourth port may result in a faster depressurization of the fuel tank relative to canister loading through the load port. An evaporative leak check module (ELCM) including a changeover valve (COV) may be positioned in the vent line between the canister and a vent valve. A diagnostic routine is desired to determine the robustness of the four-way isolation valve and the COV.

In one example, the above mentioned issue may be at least partly addressed by a vehicle method comprising: responsive to a refueling request, actuating a valve to a second position to depressurize a fuel tank via a depressurization port of a canister, during depressurization, selectively indicating degradation of the valve based on a rate of pressure decay in the fuel tank, and after depressurization, actuating the valve to a first position and initiating fueling. In this way, health of the four-way isolation valve may be opportunistically diagnosed and fueling experience for a customer may be improved.

In response to a refueling request, during a higher than threshold canister load, the four-way isolation valve may be actuated to a first position to establish fluidic communication between the fuel tank and the load port of the canister for depressurization of the fuel tank. During the depressurization of the fuel tank via the load port, the pressure of the fuel system may be monitored. If a decay in pressure is not observed, it may be inferred that the load port of the canister may be blocked disabling depressurization of the fuel tank via the load port. In response to another refueling request, during a lower than threshold canister load, the four-way isolation valve may be actuated to a second position to establish fluidic communication between the fuel tank and the depressurization port of the canister for depressurization of the fuel tank. If a decay in pressure is not observed, it may be inferred that the four-way isolation valve may be stuck closed disabling depressurization of the fuel tank via the depressurization port. After depressurization of the tank is completed, the fuel cap is unlocked and the four-way isolation valve may be actuated to the first position. The fuel system pressure may be monitored during the refueling. If fueling is prematurely shut-off, the COV of the ELCM may be indicated to be stuck closed. If it is observed that the pressure during refueling plateaus at a lower than threshold pressure, it may be inferred that the four-way isolation valve may be stuck in the second position. If it is observed that the pressure during refueling plateaus at higher than the threshold pressure and the pressure decay rate during the immediately prior depressurization of the tank was lower than a threshold rate, it may be inferred that the four-way isolation valve may be stuck in the first position. If it is observed that the pressure during refueling plateaus at higher than the threshold pressure and the pressure decay rate during the immediately prior depressurization of the tank was higher than the threshold rate, it may be inferred that the four-way isolation valve is robust and is not stuck in an undesired position.

In this way, by monitoring fuel system pressure a refueling event of a NIRCOS fuel tank, a diagnostic routine of the four-way isolation valve and the COV of the ELCM may be opportunistically carried out. The technical effect of monitoring a rate of pressure decay during depressurization prior to the refueling event is that a blockage in the load port of the canister or a stuck closed four-way isolation valve may be diagnosed. By indicating a nature of degradation of the fuel system, suitable mitigating actions may be taken. Overall, by ensuring smooth operation of the fuel system including a NIRCOS fuel tank, fuel tank depressurization may be expedited and customer satisfaction is improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
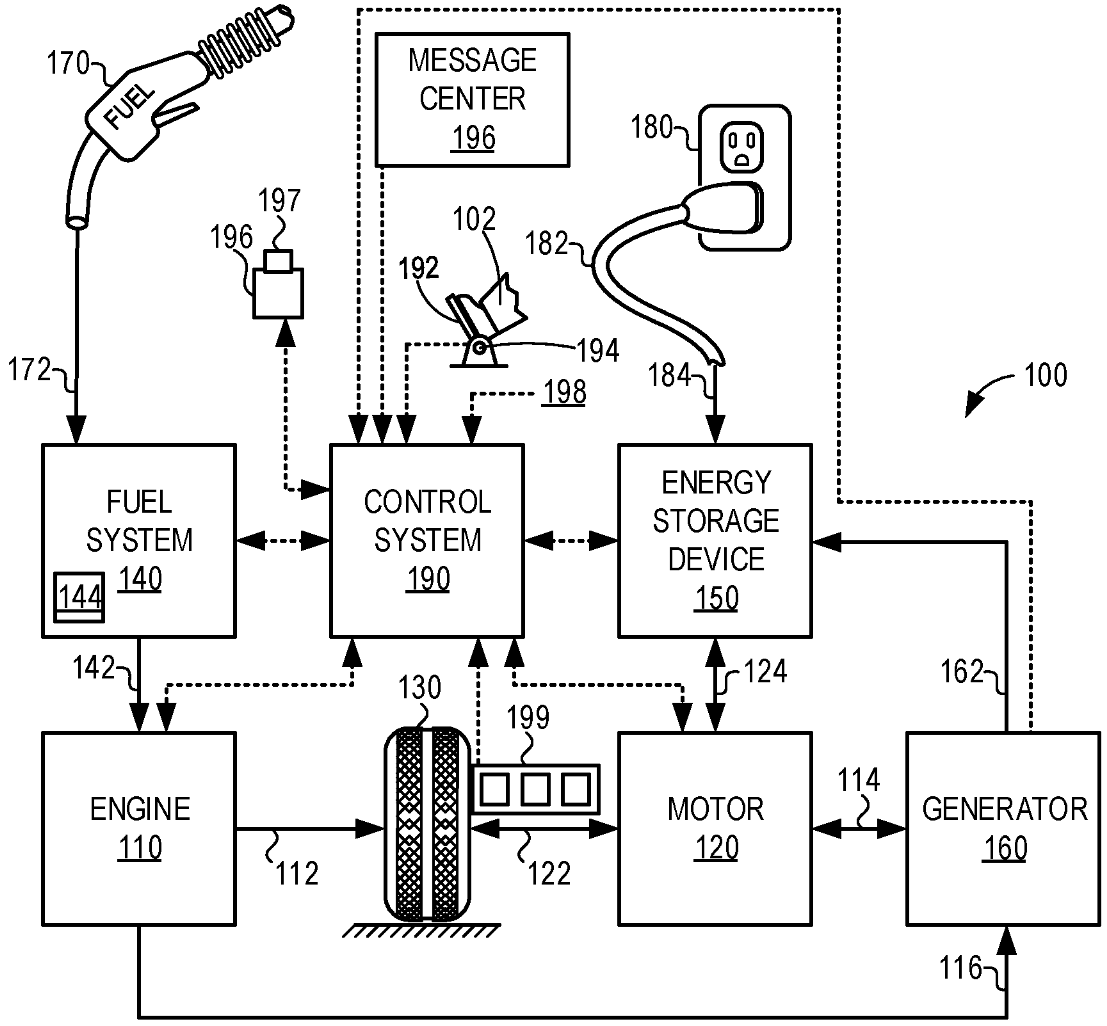
FIG. 1 shows an example vehicle propulsion system.
Figure 2:
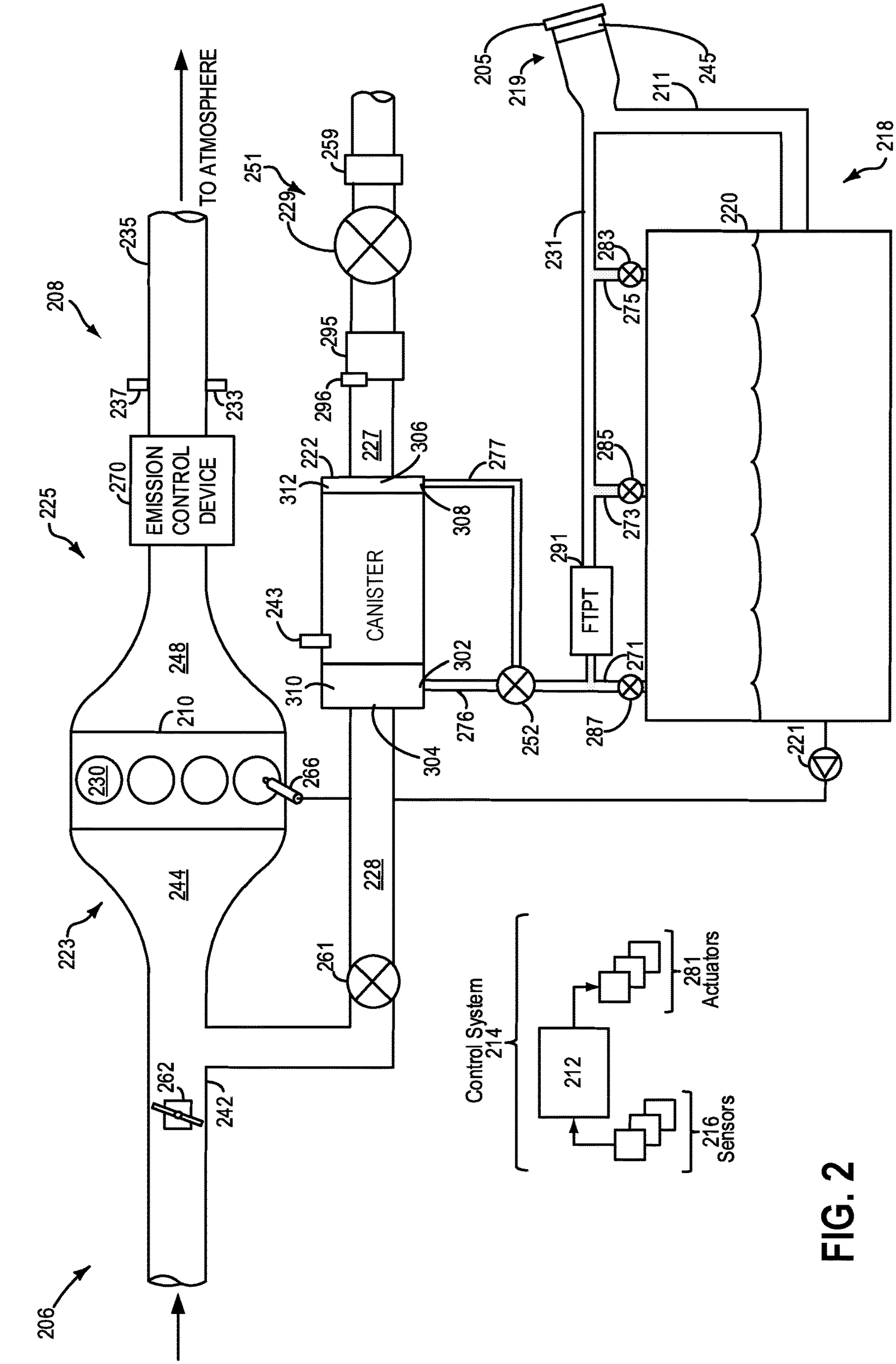
FIG. 2 shows an example fuel system and evaporative emissions system including a multi-port canister and a multi-way isolation valve that may be coupled to the vehicle propulsion system of FIG. 1.
Figure 3:
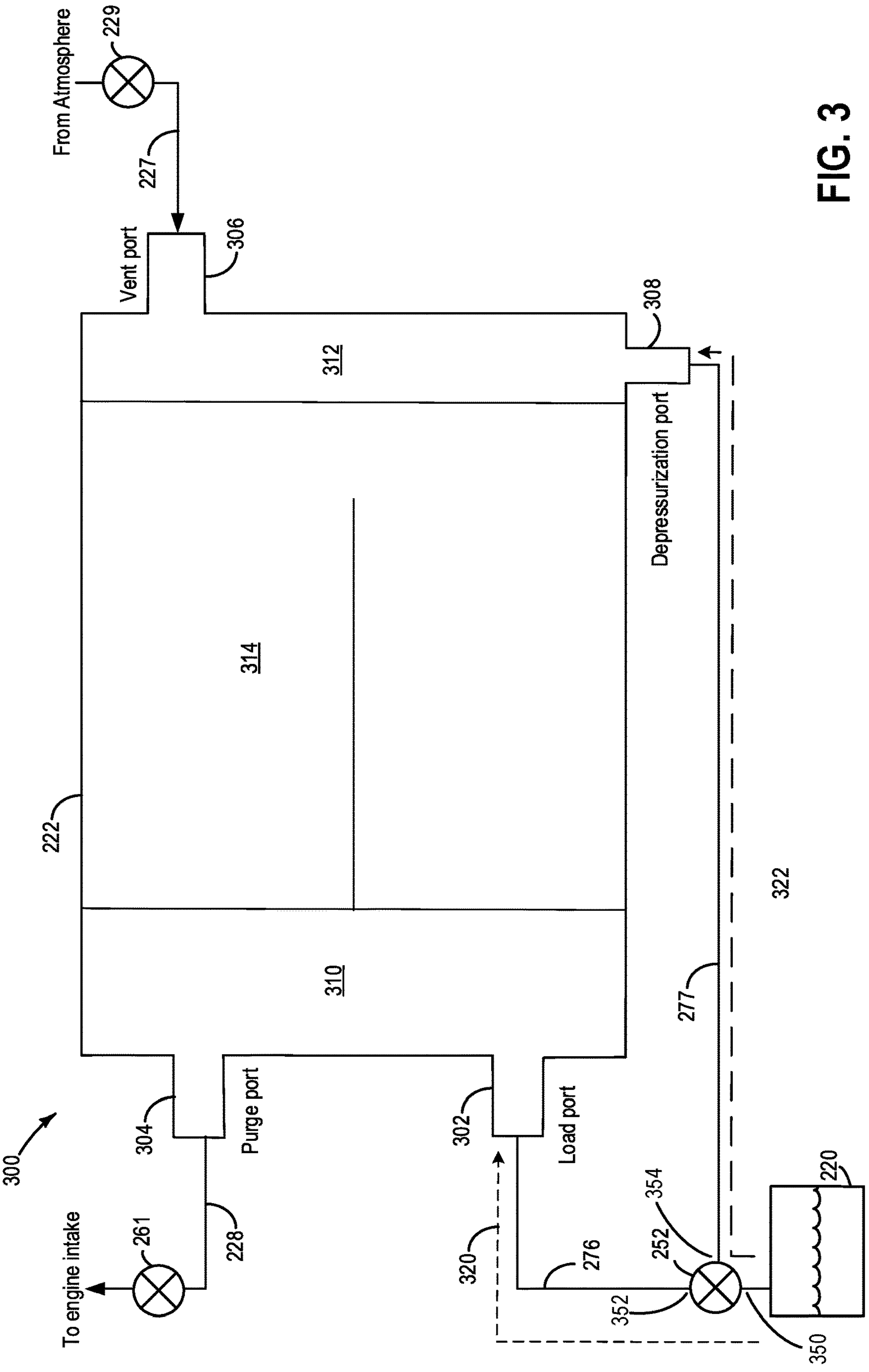
FIG. 3 shows a detailed embodiment of a four port canister coupled to a three-way isolation valve coupled to an engine evaporative emissions system.
Figure 4:
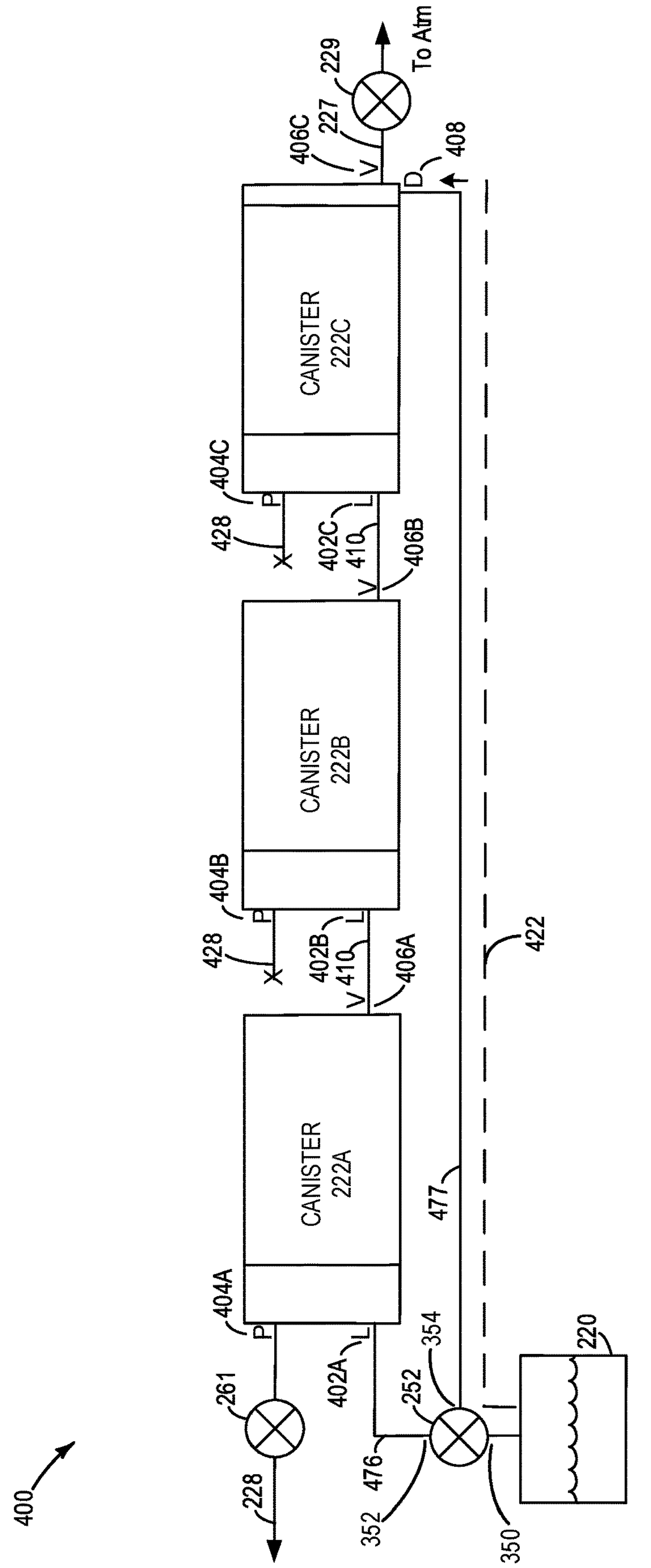
FIG. 4 shows an example configuration for a multi-canister embodiment of the evaporative emissions system of FIG. 2.
Figure 8:
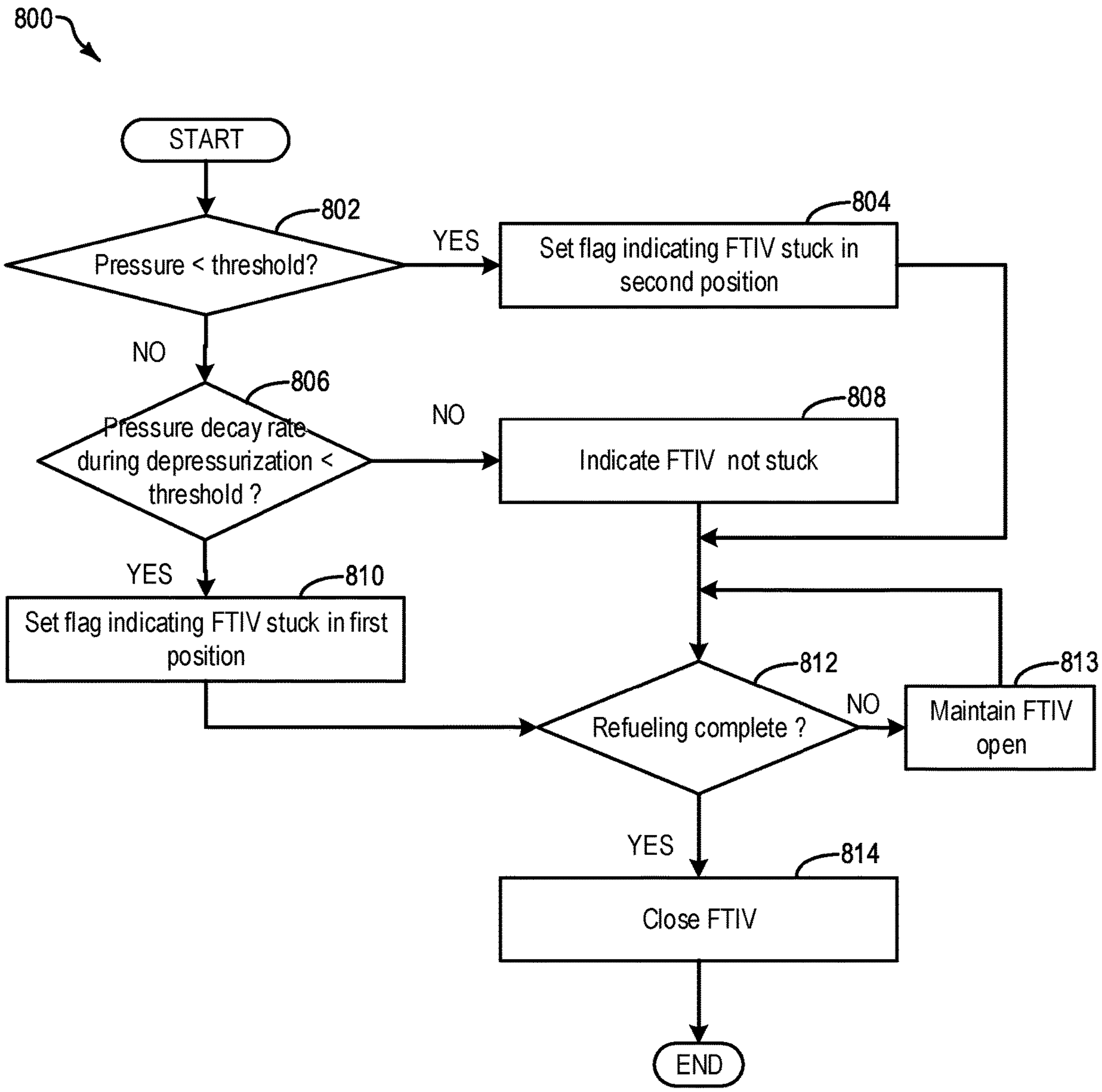
FIG. 8 shows a high level flow chart of a second example method for diagnostics of the multi-way isolation valve during a refueling event.
Figure 9:
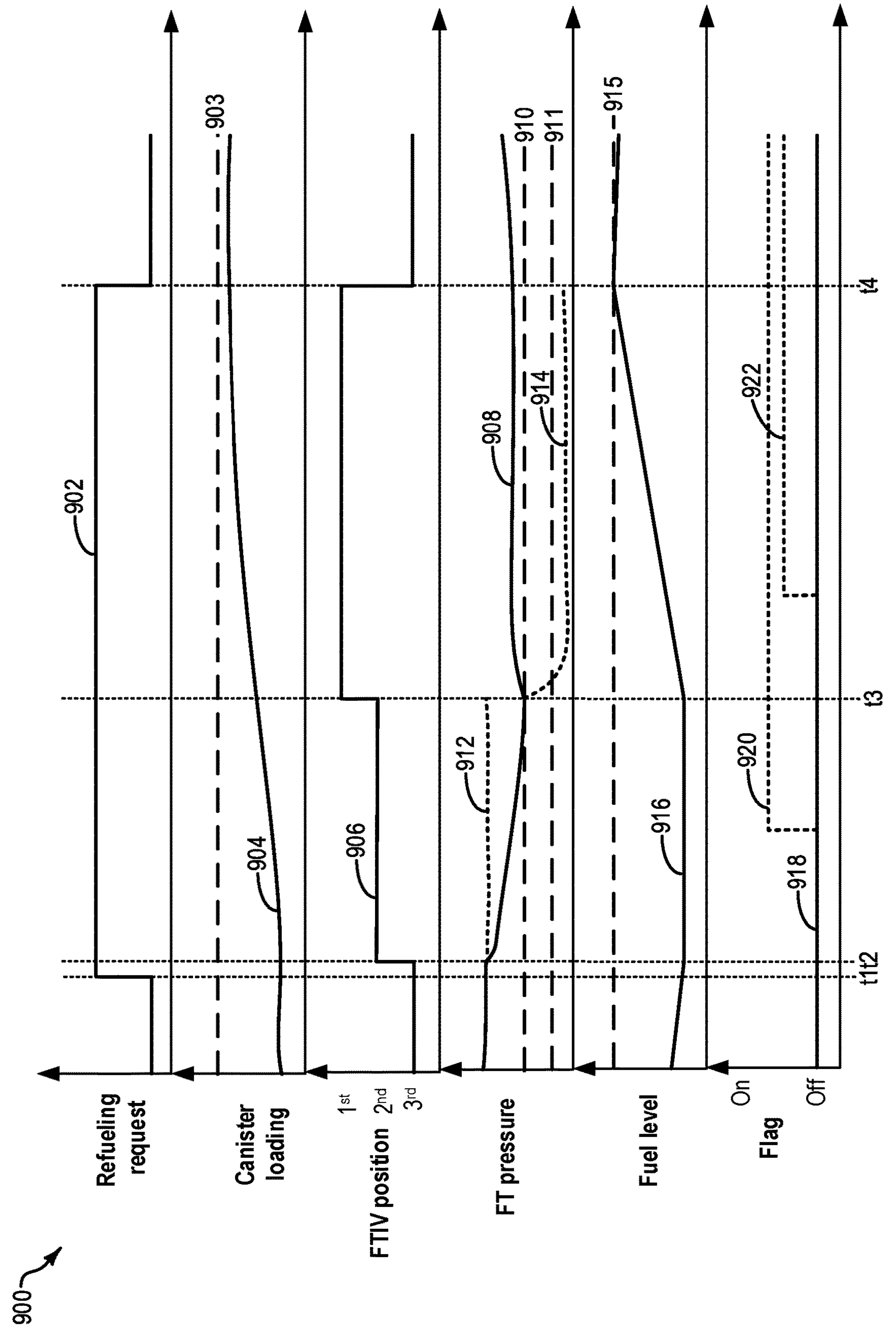
FIG. 9 shows a prophetic example diagnostics of the multi-way isolation valve during a refueling event.

The following description relates to systems and methods for diagnostics of a fuel tank isolation valve and fuel vapor canister in a non-integrated refueling canister only system (NIRCOS) in a hybrid vehicle system, such as in the vehicle system of FIG. 1. The fuel tank may be depressurized before fuel can be received in the fuel tank following a refueling request, through the use of a multi-port canister coupled to a multi-way isolation valve, such as shown at FIGS. 2-4. By selectively directing fuel tank vapors to a distal location of the canister via a dedicated port, depressurization times may be reduced. A vehicle controller may be configured to execute a control routine, such as the example routines of FIGS. 6-8, to diagnose operation of the multi-way isolation valve and the multi-port canister during a refueling event. A prophetic example of the diagnostics of the multi-way isolation valve and the multi-port canister is shown at FIG. 9.

FIG. 1 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (i.e. set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some embodiments. However, in other embodiments, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some embodiments, motor 120 may propel the vehicle via a first set of drive wheels and engine 110 may propel the vehicle via a second set of drive wheels.

In other embodiments, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

Fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some embodiments, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. Control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (HEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may be disconnected between power source 180 and energy storage device 150. Control system 190 may identify and/or control the amount of electrical energy stored at the energy storage device, which may be referred to as the state of charge (SOC).

In other embodiments, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle, such as from solar or wind energy. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some embodiments, fuel tank 144 may be configured to store the fuel received from fuel dispensing device 170 until it is supplied to engine 110 for combustion. In some embodiments, control system 190 may receive an indication of the level of fuel stored at fuel tank 144 via a fuel level sensor. The level of fuel stored at fuel tank 144 (e.g., as identified by the fuel level sensor) may be communicated to the vehicle operator, for example, via a fuel gauge or indication in a vehicle instrument panel 196.

The vehicle propulsion system 100 may also include an ambient temperature/humidity sensor 198, and a roll stability control sensor, such as a lateral and/or longitudinal and/or yaw rate sensor(s) 199. The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. For example, the vehicle instrument panel 196 may include a refueling button 197 which may be manually actuated or pressed by a vehicle operator to initiate refueling. For example, as described in more detail below, in response to the vehicle operator actuating refueling button 197, a fuel tank in the vehicle may be depressurized so that refueling may be performed.

In an alternative embodiment, the vehicle instrument panel 196 may communicate audio messages to the operator without display. Further, the sensor(s) 199 may include a vertical accelerometer to indicate road roughness. These devices may be connected to control system 190. In one example, the control system may adjust engine output and/or the wheel brakes to increase vehicle stability in response to sensor(s) 199.

FIG. 2 shows a schematic depiction of a vehicle system 206. The vehicle system 206 includes an engine system 208 coupled to an emissions control system 251 and a fuel system 218. Emission control system 251 includes a fuel vapor container such as fuel vapor canister 222 which may be used to capture and store fuel vapors. In some examples, vehicle system 206 may be a hybrid electric vehicle system, such as vehicle system 100 of FIG. 1.

The engine system 208 may include engine 210 having a plurality of cylinders 230. In one example, engine 210 includes engine 110 of FIG. 1. The engine 210 includes an engine intake 223 and an engine exhaust 225. The engine intake 223 includes a throttle 262 fluidly coupled to the engine intake manifold 244 via an intake passage 242. The engine exhaust 225 includes an exhaust manifold 248 leading to an exhaust passage 235 that routes exhaust gas to the atmosphere. The engine exhaust 225 may include one or more emission control devices 270, which may be mounted in a close-coupled position in the exhaust. One or more emission control devices may include a three-way catalyst, lean NOx trap, diesel particulate filter, oxidation catalyst, etc. It will be appreciated that other components may be included in the engine such as a variety of valves and sensors.

Fuel system 218 may include a fuel tank 220 coupled to a fuel pump system 221. In one example, fuel tank 220 includes fuel tank 144 of FIG. 1. The fuel pump system 221 may include one or more pumps for pressurizing fuel delivered to the injectors of engine 210, such as the example injector 266 shown. While only a single injector 266 is shown, additional injectors are provided for each cylinder. It will be appreciated that fuel system 218 may be a return-less fuel system, a return fuel system, or various other types of fuel system.

Vapors generated in fuel system 218 may be routed to an evaporative emissions control system 251 which includes fuel vapor canister 222 via vapor recovery line 231, before being purged to the engine intake 223. Vapor recovery line 231 may be coupled to fuel tank 220 via one or more conduits and may include one or more valves for isolating the fuel tank during certain conditions. For example, vapor recovery line 231 may be coupled to fuel tank 220 via one or more or a combination of conduits 271, 273, and 275.

Further, in some examples, one or more fuel tank vent valves may be positioned in conduits 271, 273, or 275. Among other functions, fuel tank vent valves may allow a fuel vapor canister of the emissions control system to be maintained at a low pressure or vacuum without increasing the fuel evaporation rate from the tank (which would otherwise occur if the fuel tank pressure were lowered). For example, conduit 271 may include a grade vent valve (GVV) 287, conduit 273 may include a fill limit venting valve (FLVV) 285, and conduit 275 may include a grade vent valve (GVV) 283. Further, in some examples, recovery line 231 may be coupled to a fuel filler system 219. In some examples, fuel filler system may include a fuel cap 205 for sealing off the fuel filler system from the atmosphere. Refueling system 219 is coupled to fuel tank 220 via a fuel filler pipe 211 or neck 211.

Further, fuel filler system 219 may include refueling lock 245. In some embodiments, refueling lock 245 may be a fuel cap locking mechanism. The fuel cap locking mechanism may be configured to automatically lock the fuel cap 205 in a closed position so that the fuel cap cannot be opened. For example, the fuel cap 205 may remain locked via refueling lock 245 while pressure or vacuum in the fuel tank 220 is greater than a threshold. In response to a refueling request, e.g., a vehicle operator initiated request via actuation of a refueling button on a vehicle dashboard (such as refueling button 197 on dashboard 196 of FIG. 1), the fuel tank may be depressurized and the fuel cap unlocked after the pressure or vacuum in the fuel tank falls below a threshold. Herein, unlocking the refueling lock 245 may include unlocking the fuel cap 205. A fuel cap locking mechanism may be a latch or clutch, which, when engaged, prevents the removal of the fuel cap. The latch or clutch may be electrically locked, for example, by a solenoid, or may be mechanically locked, for example, by a pressure diaphragm.

In some embodiments, refueling lock 245 may be a filler pipe valve located at a mouth of fuel filler pipe 211. In such embodiments, refueling lock 245 may not prevent the removal of fuel cap 205. Rather refueling lock 245 may prevent the insertion of a refueling pump into fuel filler pipe 211. The filler pipe valve may be electrically locked, for example by a solenoid, or mechanically locked, for example by a pressure diaphragm.

In some embodiments, refueling lock 245 may be a refueling door lock, such as a latch or a clutch which locks a refueling door located in a body panel of the vehicle. The refueling door lock may be electrically locked, for example by a solenoid, or mechanically locked, for example by a pressure diaphragm.

In embodiments where refueling lock 245 is locked using an electrical mechanism, refueling lock 245 may be unlocked by commands from controller 212, for example, when a fuel tank pressure decreases below a pressure threshold. In embodiments where refueling lock 245 is locked using a mechanical mechanism, refueling lock 245 may be unlocked via a pressure gradient, for example, when a fuel tank pressure decreases to atmospheric pressure.

Emissions control system 251 may include one or more fuel vapor canisters 222 (herein also referred to simply as canister) filled with an appropriate adsorbent, the canisters configured to temporarily trap fuel vapors (including vaporized hydrocarbons) generated during fuel tank refilling operations and "running loss" vapors (that is, fuel vaporized during vehicle operation). In one example, the adsorbent used is activated charcoal. Emissions control system 251 may further include a canister ventilation path or vent line 227 which may route gases out of the fuel vapor canister 222 to the atmosphere when storing, or trapping, fuel vapors from fuel system 218.

Vent line 227 may also allow fresh air to be drawn into canister 222 via vent valve 229 when purging stored fuel vapors from fuel system 218 to engine intake 223 via purge line 228 and purge valve 261. For example, purge valve 261 may be normally closed but may be opened during certain conditions (such as certain engine running conditions) so that vacuum from engine intake manifold 244 is applied on the fuel vapor canister for purging. In some examples, vent line 227 may include an optional air filter 259 disposed therein upstream of canister 222. Flow of air and vapors between canister 222 and the atmosphere may be regulated by canister vent valve 229.

Figure 5B:
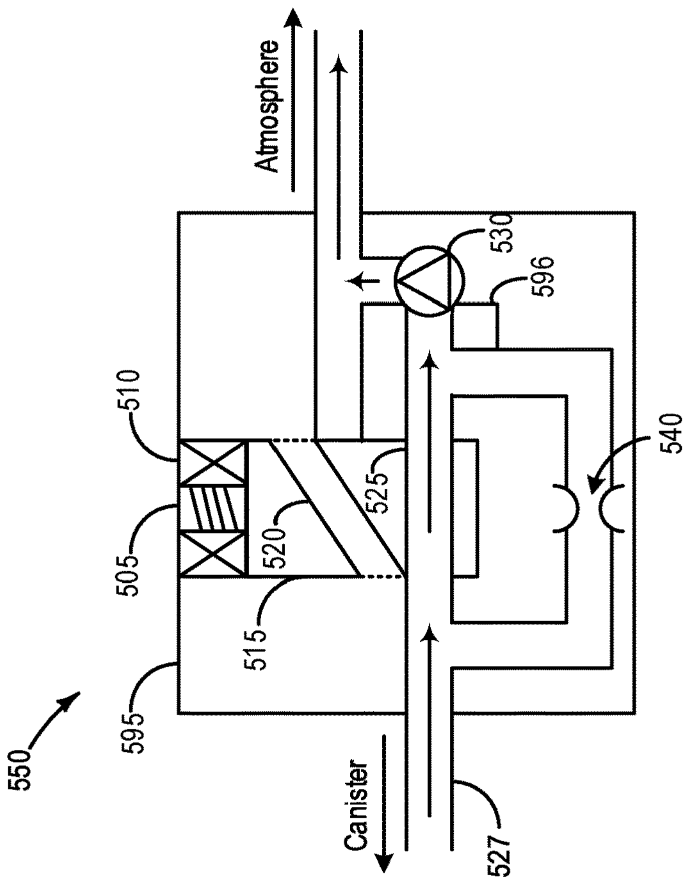
FIG. 5B shows a schematic depiction of an evaporative leak check module in a configuration to apply a vacuum to an evaporative emissions system.
Figure 5A:
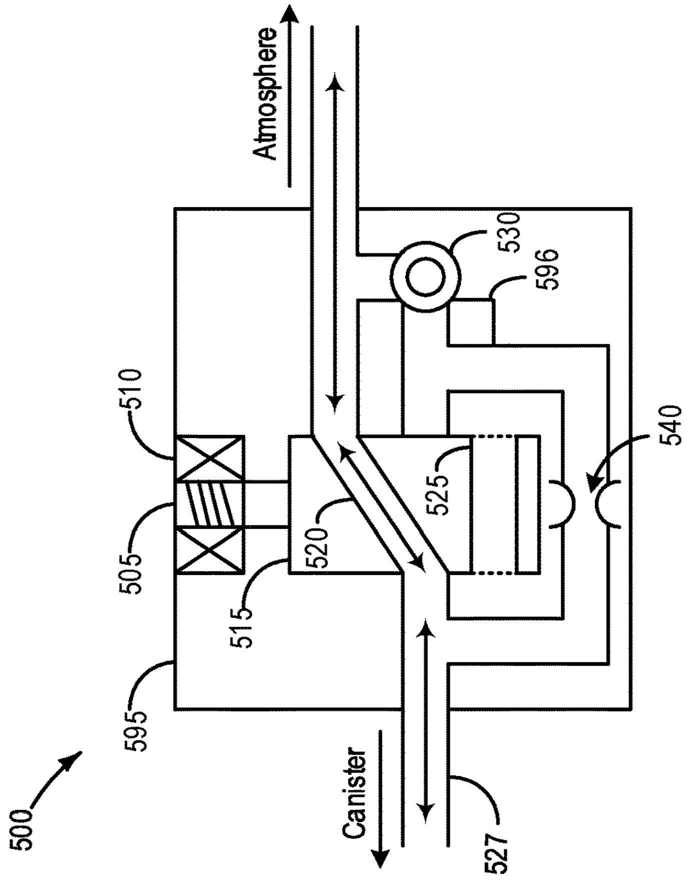
FIG. 5A shows a schematic depiction of the evaporative leak check module in a configuration where a fuel vapor canister is vented to atmosphere.

Undesired evaporative emission detection routines may be intermittently performed by controller 212 on fuel system 218 to confirm that the fuel system is not degraded. As such, undesired evaporative emission detection routines may be performed while the engine is off (engine-off leak test) using engine-off natural vacuum (EONV) generated due to a change in temperature and pressure at the fuel tank following engine shutdown and/or with vacuum supplemented from a vacuum pump. Alternatively, undesired evaporative emission detection routines may be performed while the engine is running by operating a vacuum pump and/or using engine intake manifold vacuum. Undesired evaporative emission tests may be performed by an evaporative leak check module (ELCM) 295 communicatively coupled to controller 212. ELCM 295 may be coupled in vent line 227, between canister 222 and the vent valve 229. ELCM 295 may include a vacuum pump configured to apply a negative pressure to the fuel system when in a first conformation, such as when administering a leak test. ELCM 295 may further include a reference orifice and a pressure sensor 296. Following the application of vacuum to the fuel system, a change in pressure at the reference orifice (e.g., an absolute change or a rate of change) may be monitored and compared to a threshold. Based on the comparison, undesired evaporative emissions from the fuel system may be identified. The ELCM vacuum pump may be a reversible vacuum pump, and thus configured to apply a positive pressure to the fuel system when a bridging circuit is reversed placing the pump in a second conformation. Example positions of the ELCM pump are shown in FIGS. 5A, 5B.

Canister 222 is configured as a multi-port canister. In the depicted example, canister 222 has four ports. These include a first load port 302 coupled to conduit 276 through which fuel vapors from fuel tank 220 are received in canister 222. In other words, fuel vapors that are to be absorbed in the canister 222 may be received via load port 302. Canister 222 further includes a second purge port 304 coupled to purge line 228 through which fuel vapors stored in the canister 222 can be released to the engine intake for combustion. In other words, fuel vapors that are desorbed from the canister 222 are purged to the engine intake via purge port 304. Canister 222 further includes a third purge port 306 coupled to vent line 227 through which air flow is received in the canister 222. The ambient air may be received in the canister for flowing through the adsorbent and releasing fuel vapors to the engine intake. Alternatively, air containing fuel vapors received in the canister via load port 302 may be vented to the atmosphere after the fuel vapors are adsorbed in canister 222.

Canister 222 further includes a fourth depressurization port 308 for expediting fuel tank depressurization during a refueling event. The depressurization port 308 is positioned on the distal end of the canister, adjacent to the vent port 306. Sufficient activated carbon, in the form of second buffer 312, is provided between the depressurization port 308 and the vent port 306 to expedite depressurization times. In one example, the inclusion of the depressurization port 308 on the canister 222 is to address a worst case vapor pressure inside the fuel tank 220, and the amount of adsorbent in second buffer 312 is defined by the amount of carbon needed to adsorb the amount of fuel vapors corresponding to the worst case vapor pressure. In this way, by including depressurization port 308, a “short circuit” path is opened through the canister for the fuel tank vapors, thereby reducing fuel tank depressurization time. A detailed description of canister 222 including an additional depressurization port is provided herein at FIG. 3. In embodiments where the evaporative emissions system 251 includes a plurality of canisters connected in series, the terminal canister (that is, the last canister which is most downstream and closest to the vent line) may be configured as a multi-port canister having a depressurization port, while remaining canisters may be configured as conventional three-port canisters, without a depressurization port. A detailed description of such a multi-canister arrangement is provided herein at FIG. 4.

Canister 222 may include two buffer regions, a first buffer 310 surrounding load port 302 and a second buffer 312 surrounding depressurization port 308. Like canister 222, buffers 310, 312 may also comprise adsorbent. The volume of each of buffer 310, 312 may be smaller than (e.g., a fraction of) the volume of canister 222. Further, the volume of buffer 312 surrounding the depressurization port 308 is smaller than the volume of buffer 310 surrounding the load port 302. The adsorbent in the buffers 310, 312 may be same as, or different from, the adsorbent in the canister (e.g., both may include charcoal). Buffer 310 may be positioned within canister 222 such that during canister loading through load port 302, fuel tank vapors are first adsorbed within the buffer, and then when the buffer is saturated, further fuel tank vapors are adsorbed in the main body of the canister. In comparison, when purging canister 222 with air drawn through vent line 227, fuel vapors are first desorbed from the canister (e.g., to a threshold amount) before being desorbed from the buffer. Likewise, buffer 312 may be positioned within canister 222 such that during canister loading through depressurization port 308, fuel tank vapors are first adsorbed within the buffer 312, and then when the buffer 312 is saturated, further fuel tank vapors are adsorbed in the main body 314 of the canister. In comparison, when purging canister 222 with air drawn through vent line 227, fuel vapors are first desorbed from the canister (e.g., to a threshold amount) before being desorbed from the buffer. In other words, loading and unloading of buffers 310, 312 is not linear with the loading and unloading of the canister, or each other. As such, the effect of the canister buffers is to dampen any fuel vapor spikes flowing from the fuel tank to the canister, thereby reducing the possibility of any fuel vapor spikes going to the engine or being released through a tailpipe.

Fuel tank 220 is fluidically coupled to canister 222 via each of a first conduit 276 and a second conduit 277, the first and second conduits diverging from a common fuel tank isolation valve (FTIV) 252 which controls the flow of fuel tank vapors from fuel tank 220 and vapor recovery line 231 into canister 222. In the depicted example, FTIV 252 is configured as a multi-way solenoid valve, specifically, a three-way valve. By adjusting a position of FTIV 252, fuel vapor flow from the fuel tank 220 to the canister 222 can be varied.

Figure 6:
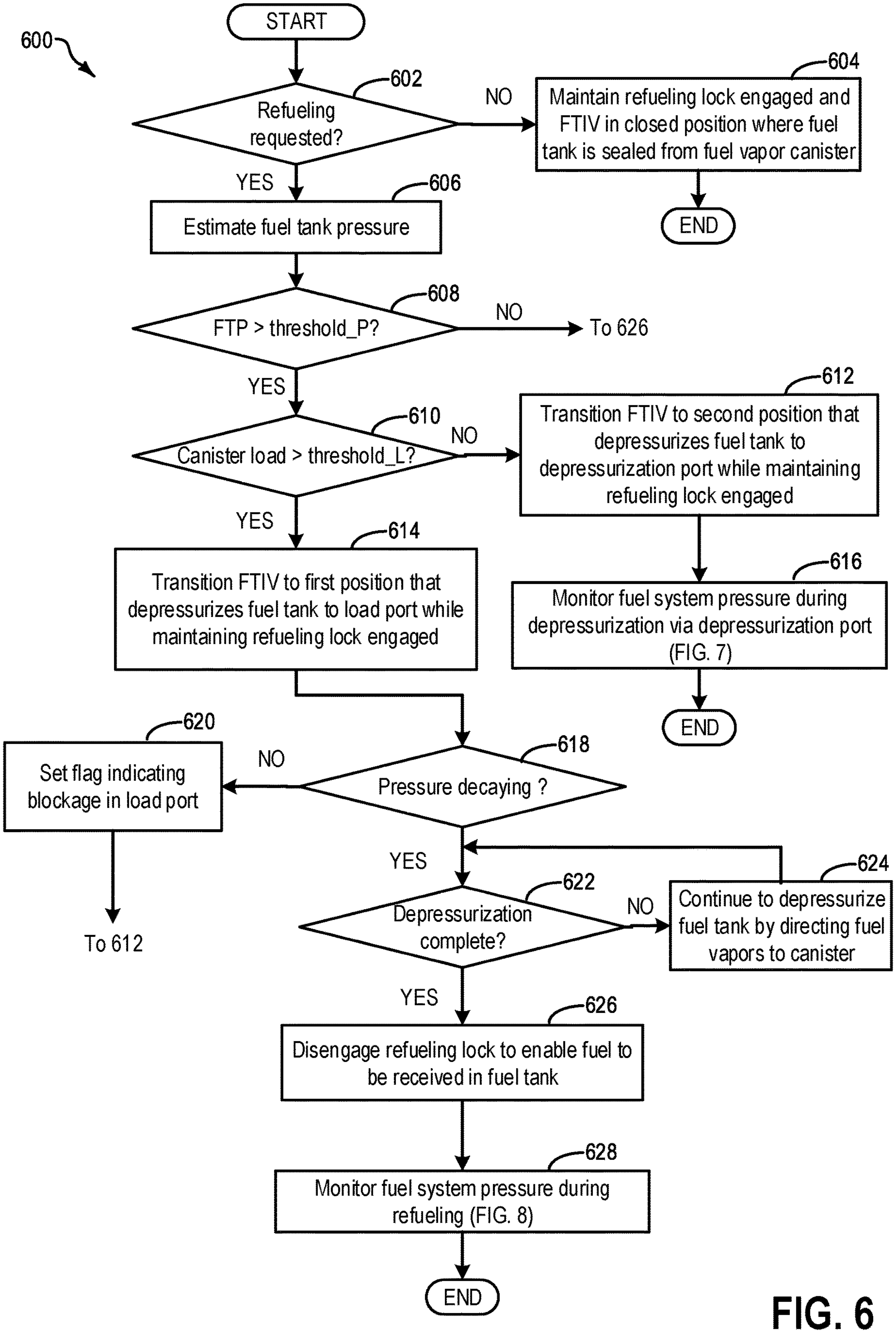
FIG. 6 shows a high level flow chart of a first example method for depressurizing a fuel tank prior to a refueling event in a hybrid vehicle including a multi-port canister and a multi-way isolation valve.

For example, FTIV 252 may be actuated to a closed position that seals fuel tank 220 from canister 222, wherein no fuel vapors flow through either conduit 276 or 277. FTIV 252 may be actuated to a first, open position that couples fuel tank 220 to canister 222 via conduit 276, with no fuel vapor flow through conduit 277. Further, FTIV may be actuated to a second, open position that couples fuel tank 220 to canister 222 via conduit 277, wherein no fuel vapor flow through conduit 276. Controller 212 may command an FTIV position based on fuel system conditions including an operator request for refueling, fuel tank pressure, and canister load. An example routine for selecting an FTIV position and a direction of fuel vapor flow into the canister 222 is shown at FIG. 6.

In configurations where the vehicle system 206 is a hybrid electric vehicle (HEV), fuel tank 220 may be designed as a sealed fuel tank that can withstand pressure fluctuations typically encountered during normal vehicle operation and diurnal temperature cycles (e.g., steel fuel tank). In addition, the size of the canister 222 may be reduced to account for the reduced engine operation times in a hybrid vehicle. However, for the same reason, HEVs may also have limited opportunities for fuel vapor canister purging operations. Therefore, the use of a sealed fuel tank with a closed FTIV (also referred to as NIRCOS, or Non-Integrated Refueling Canister Only System), prevents diurnal and running loss vapors from loading the fuel vapor canister 222, and limits fuel vapor canister loading via refueling vapors only. FTIV 252 may be selectively opened responsive to a refueling request to depressurize the fuel tank 220 before fuel can be received into the fuel tank via fuel filler pipe 211. In particular, FTIV 252 may be actuated to a first (open) position to depressurize the fuel tank to the canister via first conduit 276 and canister load port 302. Alternatively, FTIV 252 may be actuated to a second, different (also open) position to depressurize the fuel tank to the canister via second conduit 277 and additional depressurization port 308

In some embodiments (not shown), a pressure control valve (PCV) may be configured in a conduit coupling fuel tank 220 to canister 222 in parallel to conduits 276, 277. When included, the PCV may be controlled by the powertrain control module (e.g. controller 212) using a pulse-width modulation cycle to relieve any excessive pressure generated in the fuel tank, such as while the engine is running. Additionally or optionally, the PCV may be pulse-width modulated to vent excessive pressure from the fuel tank when the vehicle is operating in electric vehicle mode, for example in the case of a hybrid electric vehicle.

When transitioned to the second or third position (both open positions), FTIV 252 allows for the venting of fuel vapors from fuel tank 220 to canister 222. Fuel vapors may be stored in canister 222 while air stripped off fuel vapors exits into atmosphere via canister vent valve 229. Stored fuel vapors in the canister 222 may be purged to engine intake 223, when engine conditions permit, via canister purge valve 261. Refueling lock 245 may be unlocked to open a fuel cap only after fuel tank is sufficiently depressurized, such as below the second threshold pressure.

The vehicle system 206 may further include a control system 214. Control system 214 is shown receiving information from a plurality of sensors 216 (various examples of which are described herein) and sending control signals to a plurality of actuators 281 (various examples of which are described herein). As one example, sensors 216 may include exhaust gas sensor 237 located upstream of the emission control device, exhaust temperature or pressure sensor 233, fuel tank pressure transducer (FTPT) or pressure sensor 291, canister load sensor 243, and ELCM pressure sensor 296. As such, pressure sensor 291 provides an estimate of fuel system pressure. In one example, the fuel system pressure is a fuel tank pressure, e.g. within fuel tank 220. Other sensors such as pressure, temperature, air/fuel ratio, and composition sensors may be coupled to various locations in the vehicle system 206. As another example, the actuators may include fuel injector 266, throttle 262, FTIV 252, refueling lock 245, canister vent valve 229, and canister purge valve 261. The control system 214 may include a controller 212. The controller may receive input data from the various sensors, process the input data, and trigger the actuators in response to the processed input data based on instruction or code programmed therein corresponding to one or more routines. The controller 212 receives signals from the various sensors of FIGS. 1-2 and employs the various actuators of FIGS. 1-2 to adjust engine operation based on the received signals and instructions stored on a memory of the controller.

For example, responsive to an operator refueling request, the controller may retrieve sensor input from fuel tank pressure sensor 291 and compare it to a threshold. If the pressure is higher than the threshold, the controller may send a signal commanding FTIV 252 to a position that expedites depressurization of the fuel tank. Therein, based on canister load, as estimated via sensor 243, and/or based on an estimated time to depressurize the fuel tank, the controller 212 may adjust the position of FTIV 252 to either depressurize the fuel vapors to the load port 302 of canister 222 or depressurization port 308 of canister 222. Once the fuel tank has been sufficiently depressurized, as inferred based on the fuel tank pressure sensor output, the controller may send a signal commanding the refueling lock 245 to open or disengage so that fuel can be received in fuel tank 220 via filler pipe 211.

Figure 7:
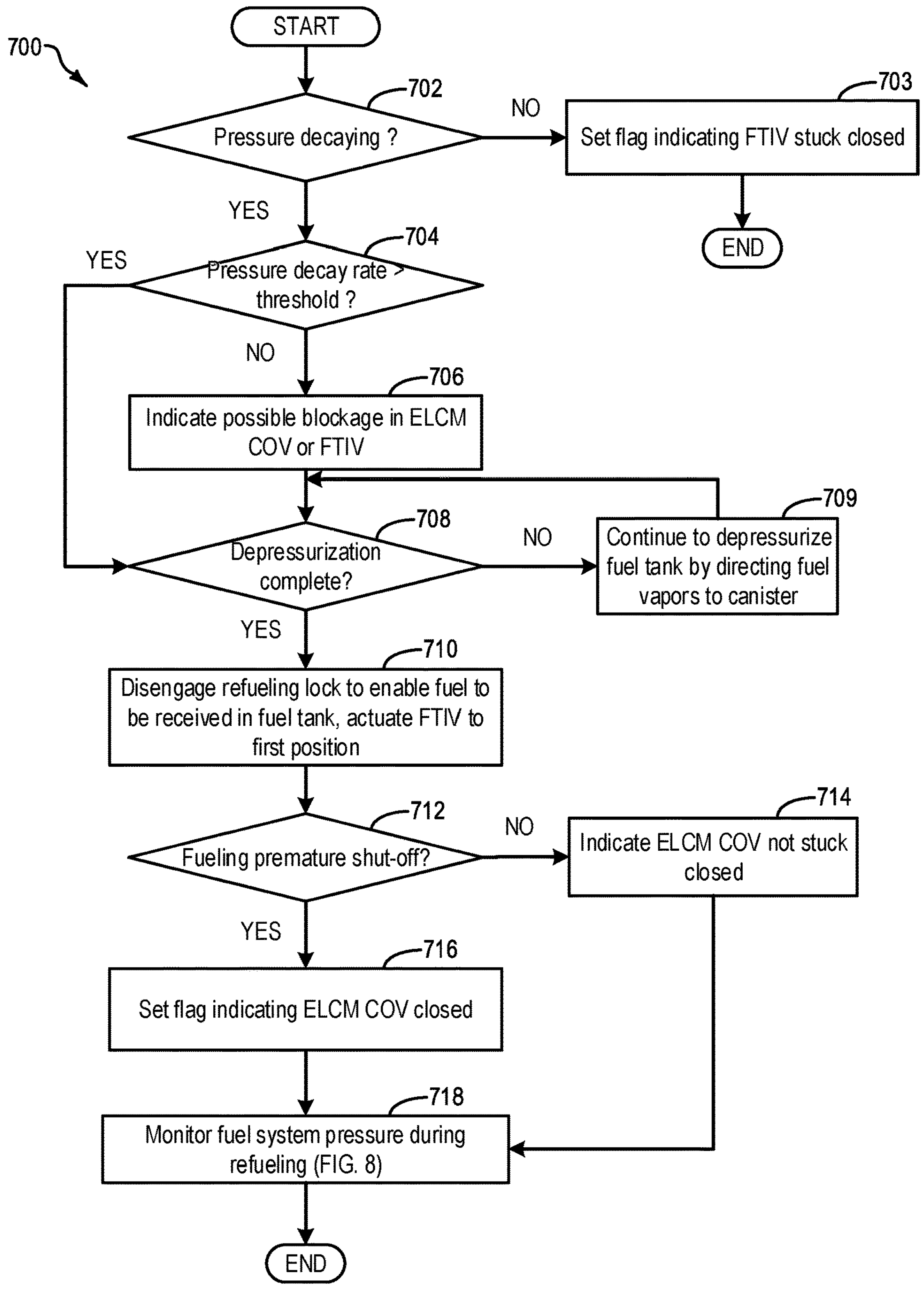
FIG. 7 shows a high level flow chart of a second example method for depressurizing the fuel tank prior to a refueling event in a hybrid vehicle including a multi-port canister and a multi-way isolation valve.

Integrity of the three-way FTIV 252 may be opportunistically monitored during depressurization and refueling of the fuel tank. In one example, in response to the rate of pressure decay in the fuel tank during depressurization being lower than a first threshold rate, the FTIV 252 may be indicated to be stuck in a third, closed position. In another example, in response to each of the rate of pressure decay in the fuel tank during depressurization being lower than a second threshold rate and a pressure in the fuel tank during refueling being higher than a threshold pressure, the FTIV 252 may be indicated to be stuck in the first position. The second threshold rate may be higher than the first threshold rate. In yet another example, during refueling, in response to the pressure in the fuel tank being lower than the threshold pressure, the FTIV 252 may be indicated to be stuck in the second position. Further, in response to each of the rate of pressure decay in the fuel tank during depressurization being lower than the second threshold rate and one or more premature shut-offs during refueling, the cross over valve (COV) of an evaporative leak check module (ELCM) housed in the vent line may be indicated to be degraded. An example routine for diagnostics of the three-way FTIV 252 and associated components is shown in FIGS. 6-8.

FIG. 3 shows an example embodiment 300 of a canister 222 having four ports including an additional depressurization port for expediting fuel tank depressurization during fuel tank refueling is shown. FIG. 4 shows an example embodiment 400 of a multi-canister arrangement. Components previously introduced in FIG. 2 are similarly numbered in FIGS. 3-4 and not reintroduced for brevity.

Turning first to FIG. 3, canister 222 includes load port 302 (also referred to as a tank port) through which canister 222 is loaded with fuel vapors. These may include fuel tank vapors from fuel tank depressurization and/or refueling vapors generated when fuel is dispensed into fuel tank 220. Fuel vapor flow into load port 302 is controlled via three-way valve FTIV 252. Specifically, when FTIV 252 is in a position that couples fuel tank 220 to conduit 276, fuel vapors may be loaded into canister 222 through load port 302.

Canister 222 further includes purge port 304 through which fuel vapors stored in canister 222 are purged to an engine intake. Purge flow from the canister to the engine intake is controlled via canister purge valve 261 positioned in purge line 228 coupling the purge port of the canister to the engine intake.

Canister 222 further includes vent port 306 through which canister 222 is vented. This includes drawing air into canister 222 from the atmosphere via vent port 306 to desorb stored fuel vapors from the canister adsorbent when purging the fuel vapors to the engine intake. This also includes flowing air from which vaporized hydrocarbons have been adsorbed at the canister 222 to the atmosphere via vent port 306 when loading fuel vapors in the canister. Vent flow between the canister and the atmosphere is controlled via canister vent valve 229 positioned in vent line 227 coupling the vent port of the canister to the atmosphere.

Canister 222 further includes depressurization port 308 through which fuel tank 220 is depressurized prior to dispensing fuel in the fuel tank. In other words, canister 222 is loaded with fuel vapors received from the fuel tank during depressurization via depressurization port 308. Fuel vapor flow into depressurization port 308 is controlled via three-way valve FTIV 252. Specifically, when FTIV 252 is in a position that couples fuel tank 220 to conduit 277, fuel vapors may be loaded into canister 222 through depressurization port 308.

Load port 302 and purge port 304 may be positioned on a common end of the canister 222, herein the proximal end. In comparison, vent port 306 and depressurization port 308 are positioned on an opposite end of the canister, herein the distal end, opposite the distal end. In one example, the vent port 306 may be configured opposite the purge port 304. Alternatively, the vent port 306 may be positioned opposite the load port 302. The depressurization port 308 may be positioned on a surface opposite the load port 302. In addition, depressurization port may be coupled to canister 222 perpendicular to vent port 306. Due to the proximity of depressurization port 308 to the vent port 306 and vent line 227, as well as due to the smaller buffer 312 surrounding depressurization port 308 as compared to the larger buffer 310 surrounding load port 302, the duration spent by fuel vapor flow through canister 222 is reduced. In particular, fuel vapors received from the fuel tank during depressurization are adsorbed in the activated carbon in the buffer region 312 surrounding the vent port and the depressurization port. This “short circuit” path 322 through depressurization port 308 therefore allows for a faster depressurization of the fuel tank as compared to fuel vapor flow through load port 302 (shown as path 320).

In some examples, depressurization port 308 may also have a larger orifice and a larger aperture than load port 302. As a result, depressurization port 308 may be configured to allow a higher fuel vapor flow rate than load port 302.

FTIV 252 is configured as a three-way valve and couples fuel tank 220 selectively to one of load port 302 and depressurization port 308. When actuated to position 450, FTIV 252 is closed resulting in the canister 222 being sealed from the fuel tank 220. When actuated to position 352, canister 222 is coupled to fuel tank 220 at load port 302. When actuated to position 354, canister 222 is coupled to fuel tank 220 at depressurization port 308.

In evaporative emission system embodiments having multiple canisters, as shown at embodiment 400 in FIG. 4, only the most downstream canister may be configured as a four port canister having a depressurization port. Embodiment 400 includes three canisters 222A-C that are serially connected wherein only canister 222C is configured with a depressurization port. Other embodiments may include fewer or more canisters. Purge port 404A of canister 222A is directly coupled to the engine intake via purge line 228 and purge valve 261. In comparison, purge ports 404B and 404C or canister 222B and 222C, respectively, are held closed. Vent port 406C of canister 222C is directly coupled to the atmosphere via vent line 227 and vent valve 229. Load port 402A of canister 222A is directly coupled to the fuel tank via FTIV 252. In comparison, canister 222A is coupled to canister 222B via vent port 406A (of canister 222A) and load port 402B (of canister 222B). Likewise, canister 222B is coupled to canister 222C via vent port 406B (of canister 222B) and load port 402C (of canister 222C). Fuel tank 220 is also coupled, via FTIV 252, to depressurization port 408 of canister 222C. In this way, a short circuit path 422 for depressurization is provided through canister 222C only, while a longer depressurization path is provided through sequential routing of fuel vapors through canister 222A, then 222B, and then 222C, via load port 402A.

During refueling events, and when pressure in fuel tank 220 is higher than a pressure threshold, FTIV 252 may be actuated to one of position 352 and position 354 to decrease the pressure in fuel tank 220 to the pressure threshold by venting fuel tank vapors to the canister 222 via one of load port 302 (or 302A) and depressurization port 308 (or 408). Since depressurization port 308, 408 has a larger orifice diameter than the orifice diameter of load port 302, 402A, by depressurizing through port 308, 408 the pressure in the fuel tank may be bled down faster. Depressurizing through port 308, 408 includes actuating FTIV 252 to position 354. Venting via depressurization port 308, 408 may be performed when the canister load is lower than a threshold load and when the ambient temperature is higher. In comparison, load port 302, 302A may have a smaller orifice diameter so that by depressurizing through port 302, 302A, the pressure in the fuel tank may be bled down slower. Depressurizing through load port 302, 30A may include actuating FTIV 252 to position 352. Venting via load port 302, 302A may be performed when the canister load is higher than a threshold load, (so that sudden fluctuations do not cause air-fuel excursions or unwanted emissions) and when the ambient temperature is lower.

In still further examples, to decrease the pressure in fuel tank 220 to the pressure threshold, the controller may first adjust FTIV 252 to position 352 to depressurize the fuel tank rapidly via depressurization port 308, 408 to a first threshold pressure, and then adjust FTIV 252 to position 354 to depressurize the fuel tank at a slower rate via load port 302, 302A to a second threshold pressure, lower than the first threshold pressure.

For example, when the FTIV 252 is in a first (closed) position 350, fuel tank vapors (including running loss and diurnal loss vapors) can be retained in the fuel tank, such as in the ullage space of the fuel tank. FTIV 252 may be normally closed during most engine operations. FTIV 252 may be actuated to a first (open) position 352, wherein fuel tank vapors are directed into canister 222 via load port 302 and conduit 276) or load port 302A and conduit 476). FTIV 252 may be transitioned to the first position 352 from closed position 350 while fuel is dispensed into the fuel tank. Also, FTIV 252 may be transitioned to the first position when fuel tank depressurization is required while canister load is elevated. By directing fuel vapors to the canister via the load port 302 during these conditions, the larger buffer 310 associated with the load port can be leveraged to reduce the occurrence of potential fuel vapor spikes.

FTIV 252 may be actuated to a second (open) position 354, wherein fuel tank vapors are directed into canister 222 via depressurization port 308 and conduit 277 (or port 408 and conduit 477). FTIV 252 may be transitioned to the second position when fuel tank depressurization is required while canister load is lower. By directing fuel vapors to the canister via the depressurization port 308, 408 during these conditions, the shorter path to the vent line enabled via the depressurization port can be leveraged to expedite the fuel tank depressurization time, and allowing for a refueling event (wherein fuel is dispensed into the fuel tank) to be initiated earlier.

FIG. 5A shows a first schematic depiction 500 of the evaporative leak check module (ELCM) 595 in a first configuration where a fuel vapor canister (such as canister 222 in FIG. 2) of the evaporative emissions control system is vented to atmosphere. FIG. 5B shows a second schematic depiction 550 of the ELCM 595 in a second configuration. The ELCM 595 may be the ELCM 295 in FIG. 2 positioned between the canister 222 and the vent valve 229.

ELCM 595 includes a changeover valve (COV) 515, a vacuum pump 530, and a pressure sensor 596. Vacuum pump 530 may be a reversible pump, for example, a vane pump. COV 515 may be moveable between a first and a second position. In the first position, as shown in FIG. 5A, air may flow through ELCM 595 via first flow path 520. In the second position, as shown in FIG. 5B, air may flow through ELCM 595 via second flow path 525. The position of COV 315 may be controlled by solenoid 510 via compression spring 505. ELCM 595 may also comprise reference orifice 540. Reference orifice 540 may have a diameter corresponding to the size of a threshold leak to be tested, for example, 0.02". In either the first or second position, pressure sensor 596 may generate a pressure signal reflecting the pressure within ELCM 595. Operation of pump 530 and solenoid 510 may be controlled via signals received from controller 212.

As shown in FIG. 5A, in the first configuration, COV 515 is in the first position, and pump 530 is deactivated. This configuration allows for air to freely flow between atmosphere and the canister via first flow path 520. This configuration may be used during a canister purging operation, for example, or during other conditions where the fuel vapor canister is to be vented to atmosphere. Upon receiving a request for refueling, the COV 515 may be actuated to the first position (first position of ELCM), to facilitate air flow through the canister and venting of the refueling vapor from the fuel tank to the canister.

As shown in FIG. 5B, COV 515 is in the second position, and pump 530 is activated in a first direction. This configuration allows pump 530 to draw a vacuum on fuel system 218 via vent line 227. In examples where fuel system 218 includes FTIV 252, FTIV 252 may be opened to allow pump 530 to draw a vacuum on fuel tank 220. Air flow through ELCM 595 in this configuration is represented by arrows. In this configuration, as pump 530 pulls a vacuum on fuel system 518, the absence of undesired evaporative emissions from the system should allow for the vacuum level in ELCM 595 to reach or exceed the previously determined vacuum threshold using reference orifice 540. In the presence of an evaporative emissions system breach larger than the reference orifice, the pump will not pull down to the reference check vacuum level, and undesired evaporative emissions may be indicated.

In this way, the components of FIGS. 1-5A, B enable evaporative emissions system for a vehicle, comprising: a fuel tank including a pressure sensor, a fuel vapor canister having a load port coupled to a fuel tank via a first conduit, a depressurization port coupled to the fuel tank via a second conduit, a vent port coupled to atmosphere via a vent line, and a purge port coupled to an engine intake via a purge line, and a valve coupling the canister to the fuel tank, the valve actuatable between a first, second, and third position, and a controller with computer-readable instructions stored on non-transitory memory which when executed cause the controller to: responsive to operator actuation of a refueling button coupled to a vehicle dashboard and fuel tank pressure being higher than a first threshold pressure at the operator actuation, command the valve to the second position to depressurize the fuel tank by directing fuel tank vapors to the depressurization port of the canister along the second conduit when canister load is lower than a threshold load, and in response to a lower than first threshold change in pressure, indicate the valve stuck in the third, closed position.

Turning now to FIG. 6, an example method 600 is shown for depressurizing a fuel tank prior to a refueling event in a hybrid vehicle including a multi-port canister (such as canister 222 in FIG. 2) and a multi-way isolation valve (such as FTIV 252 in FIG. 2). The method enables diagnostics of the FTIV and a load port of the canister. Instructions for carrying out method 600 may be executed by a controller based on instructions stored on a memory of the controller and in conjunction with signals received from sensors of the vehicle system, such as the sensors described above with reference to FIGS. 1-2. The controller may employ actuators of the vehicle system to adjust a vehicle display, according to the methods described below.

At 602, the method includes confirming if refueling has been requested. In one example, refueling may be requested by a vehicle operator by actuating a refueling button in a vehicle dashboard or display. For example, the operator may request refueling via refueling button 197 on dashboard 197 of FIG. 1. If refueling is not requested, at 604, a controller may maintain a refueling lock of the fuel system engaged to disable fuel from being dispensed into the fuel tank. In addition, the controller may maintain a FTIV in a closed position to seal the fuel tank from the fuel vapor canister. As a result, fuel vapors generated in the fuel tank (such as from diurnal cycles or running loss) are retained in the fuel tank. Maintaining the FTIV in the closed position may include maintaining the three-way FTIV in a closed position where access from the fuel tank to either of conduits 276 and 277 of the canister is disabled, the conduits coupling the fuel tank to the canister.

If a refueling request is confirmed, then at 606, the method includes estimating a fuel tank pressure, such as via a fuel tank pressure transducer (such as FTPT 291 in FIG. 2) coupled to the fuel tank. Alternatively, the fuel tank pressure may be inferred based on engine operating conditions such as duration and load of engine operation, and a rate of fuel consumption.

At 608, the method includes comparing the estimated fuel tank pressure (FTP) to a first non-zero threshold pressure (threshold_P). The first threshold pressure may correspond to a pressure level above which fuel tank integrity may be compromised, such as due to excessive fuel tank pressure being present. The threshold may be based on size, dimensions, and configuration of the fuel tank, as well as the material that the fuel tank is made of. Further, the first threshold pressure may be a function of the fuel type (e.g., octane rating or alcohol content) received in the fuel tank. If the fuel tank pressure is not higher than the first threshold pressure, then the method moves to 626 to disengage the refueling lock of the fuel system to enable fuel to be received in the fuel tank.

Else, if the fuel tank pressure is above the first threshold pressure (or if the difference between the estimated fuel tank pressure and the first threshold pressure is larger than a threshold difference), then at 610, the method includes estimating the canister load and comparing it to a threshold load (threshold_L). In one example, the canister load is inferred based on feedback from a canister sensor, such as a pressure sensor, a hydrocarbon sensor, etc. In another example, the canister load is inferred based on engine operating conditions such as a duration of engine operation since a last purging of the canister, and an average engine load and combustion air-fuel ratio over the duration. Further still, besides the HC sensor and pressure sensor, a temperature sensor embedded in the carbon bed may also be used to estimate the canister loading state. In embodiments where multiple canisters are included serially, an average canister load of all the canisters may be estimated. Alternatively, the canister load of a terminal canister having a depressurization port may be estimated. In some examples, the canister load may be a non-zero load below which the vent side of the canister is clean of vapors. Otherwise, depressurization would result in vapor escaping to the atmosphere. In one example, the canister load may exceed the threshold load if the vehicle was parked in the sun for several days with the FTIV open, or with a leaky FTIV. As elaborated below, expedited depressurization may only be allowed if the terminal buffer of the canister is able to adsorb the depressurized vapors.

If the canister load is below the threshold load, then the method moves to 612 to depressurize the fuel tank by routing tank vapors to the canister via a depressurization port (such as port 308 in FIG. 2). This includes actuating the FTIV to a second open position (such as position 354 of FIGS. 3-4) which couples the fuel tank to the depressurization port of the canister (or the depressurization port of the most downstream canister in a multi-canister arrangement).

Also, in order to vent the canister during the depressurization, a cross over valve (COV) in an evaporative leak check module (ELCM) housed in the vent line may be actuated to a first position such that the ELCM system may be operated in a first configuration, as shown in FIG. 5A. In the first configuration, the fuel vapor canister is vented to atmosphere as air may freely flow between atmosphere and the canister. Also, in this configuration, the pump of the ELCM system may be maintained in an inactive position.

The fuel tank is depressurized while maintaining a refueling lock engaged. By maintaining the refueling lock engaged, fuel is disabled from being added into the fuel tank until the fuel tank is sufficiently depressurized. As a result, the operator or attendant adding the fuel is protected from getting sprayed with fuel mist.

At 616, fuel system pressure may be monitored, via a fuel tank pressure sensor (such as FTPT 291 in FIG. 6) during the depressurization of the tank via the depressurization port. As described in FIG. 7, pressure monitored during the depressurization of the fuel tank may be used for diagnosis of the FTIV and the COV in the ELCM housed in the vent line.

Returning to step 610, if the canister load is above the threshold load, then the method moves to 614 to depressurize the fuel tank by routing tank vapors to the canister via a load port. This includes actuating the FTIV to a first open position (such as position 352 of FIGS. 3-4) which couples the fuel tank to the load port of the canister (or the load port of the most upstream canister in a multi-canister arrangement). Also, in order to vent the canister during the depressurization, the COV in the ELCM housed in the vent line may be actuated to the first position such that the ELCM system may be operated in a first configuration, as shown in FIG. 5A. In the first configuration, the fuel vapor canister is vented to atmosphere as air may freely flow between atmosphere and the canister. Also, in this configuration, the pump of the ELCM system may be maintained in an inactive position. The fuel tank is depressurized while maintaining the refueling lock engaged so that fuel cannot be dispensed into the fuel tank through a filler pipe.

At 618, the routine includes determining if the pressure in the fuel tank, as estimated via the FTPT, is decreasing as the fuel tank is being depressurized via the load port of the canister. A decay in pressure may be confirmed by a significant decrease (such as at least 10% decrease) in pressure in the fuel tank over a non-zero threshold duration. The threshold duration may be based on an initial fuel tank pressure at the onset of depressurization and a canister load. Further, a decay in pressure may be confirmed by a higher than first threshold rate of decrease in pressure.

If it is determined that the pressure in the fuel tank is not decreasing as the fuel tank is being depressurized via the load port of the canister, it may be inferred that fuel vapor is not being routed from the fuel tank to the first buffer in the canister via the load port due to a blockage in the load port or a first conduit (such as first conduit 276 in FIGS. 2-3) connecting the FTIV to the load port. The blockage in the load port may arise due to carbon dust, ambient dust, liquid fuel plugging the port or the first conduit. At 620, a flag may be set indicating blockage in the load port of the canister or the first conduit. Since the load port is blocked, the fuel tank may not be depressurized via the load port. Therefore, in response to the detection of load port blockage, even during a higher than threshold canister load, the routine may proceed to 612 where the fuel tank is depressurized via the depressurization port.

If at 618 it is determined that pressure is decaying in the fuel tank, the routine may proceed to 622 to confirm if fuel tank depressurization is complete. In one example, depressurization may be confirmed if the fuel tank pressure is lower than the first threshold pressure threshold_P. In another example, where the threshold pressure (threshold_P) is an upper threshold, the controller may confirm that the fuel tank pressure has dropped from above upper threshold pressure to lower than a lower threshold pressure. If the fuel tank has not depressurized sufficiently, at 624, the method includes continuing to depressurize the fuel tank by directing fuel vapors to the canister through the load port (at 614) while maintaining the refueling lock engaged.

After the tank has fully depressurized, at 626, the controller may provide signals to disengage the refueling lock to enable fuel to be received in fuel tank. The FTIV may be maintained in the first, open position to direct refueling vapors generated while fuel is dispensed into the fuel tank to the canister via the load port. In this way, refueling vapors generated while fuel is dispensed into the fuel tank to be captured and retained at the fuel vapor canister for purging later.

The pressure in the fuel tank may be monitored via the FTPT during the refueling. As described in FIG. 8, pressure monitored during the refueling of the fuel tank may also be used for diagnosis of the FTIV.

FIG. 7 shows an example method 700 for depressurizing the fuel tank via the depressurization port prior to a refueling event in a hybrid vehicle and carrying out diagnostics of the FTIV. Method 700 may be part of method 600 and may be carried out at step 616 in FIG. 6.

At 702, the routine includes determining if the pressure in the fuel tank, as estimated via the FTPT, is decaying as the fuel tank is being depressurized via the depressurization port of the canister. A decay in pressure may be confirmed by a significant decrease (such as at least 10% decrease) in pressure in the fuel tank over a non-zero threshold duration. The threshold duration may be based on an initial fuel tank pressure at the onset of depressurization and a canister load. Further, a decay in pressure may be confirmed by a higher than first threshold rate of decrease in pressure.

If it is determined that the pressure in the fuel tank is not decaying while the fuel tank is being depressurized via the depressurization port, it may be indicated that fuel vapor from the fuel tank is unable to flow to the second buffer region of the canister via the depressurization port. At 703, a flag may be set indicating that FTIV is stuck in a closed position and depressurization of the fuel tank may not be carried out.

In one example, if it is determined that the pressure in the fuel tank is not decaying while the fuel tank is being depressurized via the depressurization port, depressurization may be attempted via the load port and the routine may proceed to step 614. The FTIV may be actuated to a first position to depressurize the fuel tank via the load port. If it is determined that the pressure in the fuel tank is not decaying even after the fuel tank is attempted to be depressurized via the load port, it may be confirmed that the FTIV is stuck closed.

In response to indication of the FTIV being stuck closed, a code/message may be displayed to the operator via the vehicle dashboard and/or via a smart device (such as smartphone) to alert the operator that the refueling would be initiated with the fuel tank under pressure. Fueling may be initiated with the fuel tank pressurized.

If it is determined that the pressure in the fuel tank is not decaying while the fuel tank is being depressurized via the depressurization port, at 704, the routine includes determining if the rate of pressure decay is higher than a second threshold rate of decrease in pressure. The second threshold rate may be higher than the first threshold rate. Further, the routine may include determining if a duration of depressurization of the fuel tank is lower than a threshold duration. In one example, the threshold duration may be 2 seconds.

If it is determined that the pressure decay rate is lower than the second threshold rate and/or duration of depressurization of the fuel tank is higher than the threshold duration, at 706, the routine includes indicating possible blockage in one or more of a cross over valve (COV) of an evaporative leak check module (ELCM) housed in the vent line and the FTIV. If the COV is blocked, a restriction in the vent line increases the time for depressurization. Further, if the FTIV is stuck in the first, open position (communication between fuel tank and load port of canister), the rate of depressurization via the depressurization port may decrease due to the lack of communication between the fuel tank and the depressurization port via the FTIV. The nature of degradation causing the lower rate of depressurization may be resolved during the refueling, as elaborated in FIG. 8. The routine may then proceed to step 708. If it is determined that the pressure decay rate is higher than the second threshold rate and/or duration of depressurization of the fuel tank is lower than the threshold duration, the routine may also proceed to 708.

At 708, the routine includes determining if depressurization is complete. Completion of depressurization may be confirmed in response to the pressure in the fuel tank reducing to the first non-zero threshold pressure (threshold_P). Threshold_P may correspond to a pressure level above which fuel tank integrity may be compromised, such as due to excessive fuel tank pressure being present. The first threshold may be based on size, dimensions, and configuration of the fuel tank, as well as the material that the fuel tank is made of. Further, the threshold pressure may be a function of the fuel type (e.g., octane rating or alcohol content) received in the fuel tank. If it is determined that depressurization is not complete such as if the fuel tank pressure continues to be above threshold_P, at 709, depressurization of the fuel tank may be continued by directing fuel vapor from the fuel tank to the canister via the depressurization port.

If it is determined that depressurization is complete, at 710, the controller may provide signals to disengage the refueling lock to enable fuel to be received in fuel tank. Also, the FTIV may be transitioned to a first, open position that directs refueling vapors generated while fuel is dispensed into the fuel tank to the canister via the load port. For example, the FTIV may be actuated to position 352 of FIGS. 3-4. In this way, refueling vapors generated while fuel is dispensed into the fuel tank to be captured and retained at the fuel vapor canister for purging later. Fuel may then be dispensed by a user into the fuel tank.

At 712, the routine includes determining if the fueling has been premature shut off. A spike in fuel tank pressure may cause the fueling to be shut off prior to a maximum fuel level being reached during the refueling. In one example, during refueling, air is drawn in from the vent line through the COV of the ELCM system with the COV in a first position (such as shown in FIG. 5A). However, if the COV is stuck in a second position, as shown in FIG. 5B, air may not freely enter the vent line through the ELCM system. In the absence of fresh air reaching the canister via the vent line, the canister may not be able to vent during refueling which may cause spikes in pressure in the fuel tank even without the fuel tank being full.

If it is determined that fueling has not been prematurely shut off during the fueling, it may be inferred that the canister may be effectively vented via the ELCM system and the vent line. At 714, it may be indicated that the ELCM COV is not stuck closed (such as in second position as shown in FIG. 5B) and that air may freely pass through the ELCM system. The routine may then proceed to step 718 and fuel system pressure may be continued to be monitored during the refueling. Details of the monitoring and diagnostics of the FTIV is shown in FIG. 8.

If it is determined that there are one or more premature shut-offs during refueling, it may be inferred that the canister is not being vented due to a blocked COV. At 716, a flag may be set indicating that the ELCM COV is closed such as stuck in the second position even when it was commanded to the first position.

In response to indication of the COV being stuck closed, a code/message may be displayed to the operator via the vehicle dashboard and/or via a smart device (such as smartphone) to alert the operator that during refueling, pre-mature shut-offs may occur and a longer duration may be needed to fill the fuel tank. Also, if refueling is carried out at a smart gas station fuel pump wherein the fuel pump is communicatively connected to the vehicle controller, the controller may send a request to the fuel pump to reduce the flow rate of fuel into the fuel tank in order to reduce the possibility of fuel spit back during premature shut-offs.

The user refilling the tank may resume dispensing fuel into the fuel tank after a premature shut-off. The routine may then proceed to 718 and fuel system pressure may be monitored during the remaining portion of the refueling.

FIG. 8 shows an example method 800 for diagnosing a FTIV during refueling of a fuel tank. Method 800 may be part of method 700 and may be carried out at step 718 in FIG. 8. At 802, the routine includes determining if a pressure in the fuel tank during the refueling is lower than a second threshold pressure. During refueling, pressure in the fuel tank may stabilize at a refueling pressure (pressure plateau). The pressure plateau may be based on the rate of fill of the fuel tank. In one example, the pressure plateau may be in a range of 4-6 $inH_2O$. The second threshold pressure may be lower than a pressure plateau corresponding to the rate of fill. In one example, the controller may use a look-up table to determine the second threshold pressure based on the rate of fill with the rate of fill as input and second threshold pressure as output.

If it is determined that the pressure plateau in the fuel tank during refueling is lower than the refueling threshold pressure, it may be inferred that the FTIV is stuck in the second, open position with the fuel tank venting to the second buffer of canister via the depressurization port instead of venting to the first buffer via the load port. At 804, a flag may be set indicating FTIV being stuck in the second position. The lower than second threshold pressure plateau may be caused due to loss of resistive carbon bed in the second buffer. In response to indication of the FTIV being stuck in the second, open position, an amount of fuel that may be dispensed during the refueling may be limited to a threshold level, the threshold level below the maximum fill level that may be reached in the fuel tank (capacity of the tank). A code/message may be displayed to the operator via the vehicle dashboard and/or via a smart device (such as smartphone) to alert the operator that the refueling would be limited to the threshold level (and not the maximum fill level) and the vehicle needs to be serviced.

The routine may then proceed to step 812.

If it is determined that the pressure plateau in the fuel tank during refueling is higher than the refueling threshold pressure, it may be inferred that the refueling vapors are transmitted to the first buffer of the canister via the load port. At 806, the routine includes determining if the pressure decay rate in the fuel tank during depressurization immediately prior to the refueling was estimated to be lower than the second threshold rate of decrease in fuel tank pressure (as determined in step 704 in FIG. 7). As elaborated in FIGS. 6 and 7, the fuel tank may be depressurized via the depressurization port in response to a request for fuel tank refill. Further, the routine may include determining if a duration of depressurization of the fuel tank is lower than a threshold duration. In one example, the threshold duration may be 2 seconds.

If it is determined that the pressure decay rate in the fuel tank during depressurization immediately prior to the refueling was higher than the second threshold rate of decrease in pressure and the pressure plateau in the fuel tank during refueling is higher than the second threshold pressure, it may be inferred that the fuel system is robust. At 808, it may be indicated that the FTIV is not stuck in any position and is actuatable between a closed position, a first open position, and a second open position. The routine may then proceed to step 812.

If it is determined that even though the pressure plateau in the fuel tank during refueling is higher than the second threshold pressure, the pressure decay rate in the fuel tank during depressurization immediately prior to the refueling was lower than the second threshold rate of decrease in pressure, it may be inferred that the FTIV could not be actuated to the commanded second position for depressurization of the fuel tank via the depressurization port. At 810, it may be indicated that the FTIV is stuck in the first open position causing the fuel tank to be depressurized slower via the load port of the canister instead of the intended depressurization port. When the FTIV was actuated from the first position to the second position, the FTIV remained in the first position. The FTIV remaining in the first position does not have any adverse effect during the refueling as the refueling vapors are vented to the canister via the load port. The routine may then proceed to step 812.

At 812, it is determined if refueling is complete, such as may occur when the fuel tank reaches a fill level corresponding to a maximum capacity of the fuel tank. If it is indicated that the FTIV is stuck in the second position, refueling may be determined to be complete upon the fuel tank reaches a fill level corresponding to the threshold level of fuel (lower than the maximum capacity). If not, then at 813, the controller may maintain the FTIV open in the first position that couples the fuel tank to the canister via the load port, and the refueling lock disengaged while receiving fuel in fuel tank via the refueling door. Else, once refueling is completed, at 814, the controller commands the FTIV closed and engages the refueling lock. For example, the FTIV may be actuated to position 350 of FIGS. 3-4. This seals the fuel tank from the canister until a subsequent fuel tank depressurization or refueling event.

In this way, upon receiving a request for refueling, during a first condition, a fuel tank isolation valve (FTIV) may be actuated to a first position to depressurize a fuel tank, and during a second condition, the FTIV may be actuated to a second position to depressurize the fuel tank, and during depressurization, degradation of the FTIV may be indicated based on a rate of pressure decay in the fuel tank. The first condition may include a lower than threshold load in a fuel vapor canister, and actuating the FTIV to the first position establishes fluidic communication between the fuel tank and a load port of the canister. The second condition may include a higher than threshold load in the fuel vapor canister, and actuating the FTIV to the second position establishes fluidic communication between the fuel tank and a depressurization port of the canister, the load port positioned on a proximal end of the canister with a purge port, the depressurization port positioned on a distal end of the canister with a vent port.

Turning now to FIG. 9, map 900 depicts a prophetic example of diagnostics of a three-way FTIV (such as FTIV 252 in FIG. 2) actuated during a refueling event to depressurize a fuel tank via a 4-port canister (such as canister 222 in FIG. 2). The horizontal (x-axis) denotes time and the vertical markers t1-t4 identify significant times in the routine for FTIV diagnostics carried out in response to a refueling request.

The first plot, line 902, depicts a refueling request such as indicated by an operator pressing a refueling button on a vehicle dashboard. The second plot, line 904, shows fuel vapor load in the canister load. Dashed line 903 shows a threshold canister load below which the fuel tank can be vented to a second, additional buffer of the canister via a depressurization port (such as port 308 in FIG. 3). The third plot, line 906, denotes the position of the FTIV. The FTIV is actuable between a first, open position fluidically connecting the fuel tank to a load port (such as port 302 in FIG. 3) of the canister, a second, open position fluidically connecting the fuel tank to the depressurization port of the canister, and a third, closed position sealing the fuel tank. The fourth plot, line 908, depicts fuel tank pressure as estimated via a fuel tank pressure sensor (such as FTPT 291 in FIG. 2). A first threshold fuel tank pressure is shown by dashed line 910. Prior to initiation of refueling, the fuel tank pressure is desired to be at or below the non-zero first threshold pressure. A second threshold fuel tank pressure is shown by dashed line 911. During refueling, in robust fuel systems, the fuel tank pressure plateaus above the non-zero second threshold fuel tank pressure. The fifth plot, line 916, denotes a fuel level in the fuel tank as estimated via a fuel level sensor. Dashed line 915 denotes a maximum fuel level up to which the tank may be filled. The sixth plot, shows a flag indicating a diagnostics code for a degraded FTIV. In the depicted example, the operations may be performed in the context of a hybrid electric vehicle.

Prior to t1, the vehicle is operating and no refueling is requested. The canister load is low due to canister fuel vapors being purged to the engine intake during vehicle propulsion using engine torque and fuel vapor from the fuel tank not being routed to the canister. The fuel tank pressure is elevated due to running losses accumulating in the fuel tank's ullage space. At t1, the vehicle is stopped and the operator indicates a request to refill the tank by actuating a refueling button on a vehicle dashboard. In response to the fuel tank pressure exceeding the first threshold pressure 610 at the time refueling is requested, and the canister load being lower than threshold load 903, at time t2, the fuel tank is depressurized by actuating the FTIV from the closed, third position to the second, open position that couples the fuel tank to the depressurization port of the canister. This allows for depressurization to be expedited so that the fuel tank can be refueled following a shorter delay. At this time, the refueling lock is maintained engaged so that fuel cannot be received in the fuel tank.

The FTIV is held at the second position from t2 to t3. As the fuel tank depressurizes, the canister load increases due to fuel vapors being adsorbed in the canister. At time t3, the fuel tank pressure decays to the first threshold pressure 910. Since the fuel tank is successfully depressurized, it is inferred that the FTIV could be actuated to an open position and the flag is maintained in an off state.

However, if it was observed that the pressure in the fuel tank does not decay significantly (such as more than 5%), as shown by dashed line 912, even when the FTIV is actuated to an open position, it would have been inferred that the FTIV is stuck in the closed, third position. As shown by dashed line 920, a flag would have been set indicating degradation of the FTIV.

At time t3, in response to the fuel tank pressure decreasing to the first threshold pressure 910, fueling is initiated by disabling a refueling lock. Also, the FTIV is actuated to a first, open position to route refueling vapors to the canister via the load port. Upon enabling fueling, the fuel level increases in the fuel tank and the fuel tank pressure plateaus above the second threshold pressure 911. Since the fuel tank pressure during fueling is maintained above the second threshold pressure, it is inferred that the FTIV has been successfully shifted to the first position.

However, if it was estimated that the pressure in the fuel tank stabilizes below the second threshold pressure, as shown by dashed line 911, it would have been inferred that the FTIV was stuck in the second position even when it was actuated to the first position. As shown by dashed line 922, a flag would have been set indicating degradation of the FTIV.

At time t4, in response to the fuel level in the fuel tank increasing to maximum fuel level 915, fueling is disabled. The FTIV is transitioned to the third, closed position to seal the fuel tank and limit flow of fuel vapors to the canister.

In this way, during a refueling event, a depressurization time remaining before fuel can be dispensed into a fuel tank can be reduced by loading a canister via an added depressurization port and during the depressurization and subsequent fueling, diagnostics of the FTIV may be opportunistically carried out. By indicating a location of degradation of the fuel system, suitable mitigating actions may be taken. The technical effect of identifying blockage in a canister port is that depressurization through another canister port may be commanded to enable fueling. Overall, by ensuring regular monitoring of components in a fuel system, fuel tank depressurization may be expedited and customer satisfaction is improved during a refueling event.

An example method for a vehicle, comprising: responsive to a refueling request, actuating a valve to a second position to depressurize a fuel tank via a depressurization port of a canister, during depressurization, selectively indicating degradation of the valve based on a rate of pressure decay in the fuel tank, and after depressurization, actuating the valve to a first position and initiating fueling. In the preceding example, additionally or optionally, upon actuation of the valve to the first position, the fuel tank is fluidically coupled to a load port of the canister leading to a first buffer in the canister, and wherein upon actuation of the valve to the second position, the fuel tank is fluidically coupled to a depressurization port of the canister leading to a second buffer in the canister, the second buffer including a smaller absorbent area relative to the first buffer. In any or all of the preceding examples, additionally or optionally, the depressurization port is positioned closer to a vent port of the canister than the load port, and wherein the load port is closer to a purge port of the canister than the depressurization port. In any or all of the preceding examples, additionally or optionally, during depressurization of the fuel tank, a refueling lock is maintained in an engaged position, and a rate of change in fuel tank pressure is monitored via a fuel tank pressure sensor, and wherein initiating fueling includes disengaging the refueling lock allowing fuel to enter the fuel tank. In any or all of the preceding examples, additionally or optionally, selectively indicating degradation of the valve includes in response to the rate of pressure decay in the fuel tank during depressurization via the depressurization port being lower than a first threshold rate, actuating the valve to the first position to depressurize the fuel tank via the load port of the canister. In any or all of the preceding examples, additionally or optionally, the method further comprising, in response to each of the rate of pressure decay in the fuel tank during depressurization being lower than a second threshold rate and one or more premature shut-offs during refueling, indicating degradation of a cross over valve (COV) of an evaporative leak check module (ELCM) housed in the vent line, the second threshold rate higher than the first threshold rate. In any or all of the preceding examples, additionally or optionally, the method further comprising, in response to each of the rate of pressure decay in the fuel tank during depressurization being lower than the second threshold rate and a pressure in the fuel tank during refueling being higher than a threshold pressure, indicating the valve to be stuck in the first position. In any or all of the preceding examples, additionally or optionally, the method further comprising, during refueling, in response to the pressure in the fuel tank being lower than the threshold pressure, indicating the valve to be stuck in the second position, the method further comprising, in response to indication of the valve being stuck in the second position, limiting an amount of fuel in the fuel tank to a threshold level, the threshold level lower than a maximum fill level of the fuel tank. In any or all of the preceding examples, additionally or optionally, the actuating the valve to the second position to depressurize the fuel tank via the depressurization port of the canister is in response to a lower than threshold load in the canister, the method further comprising, in response to a higher than threshold load in the canister, actuating the valve to the first position to depressurize the fuel tank via the load port. Any or all of the preceding examples further comprising, additionally or optionally, during depressurization of the fuel tank via the load port, in response to the rate of pressure decay in the fuel tank being lower than the first threshold, indicating blockage in the load port and actuating the valve to the second position to depressurize the fuel tank via the depressurization port. In any or all of the preceding examples, additionally or optionally, the method further comprising, upon completion of refueling, actuating the valve to the third, closed position and engaging the refueling lock.

Another example for an engine in a vehicle, comprising: upon receiving a request for refueling, during a first condition, actuating a fuel tank isolation valve (FTIV) to a first position to depressurize a fuel tank, and during a second condition, actuating the FTIV to a second position to depressurize the fuel tank, and during depressurization, indicating degradation of the FTIV based on a rate of pressure decay in the fuel tank. In any or all of the preceding examples, additionally or optionally, the first condition includes a lower than threshold load in a fuel vapor canister, and wherein actuating the FTIV to the first position establishes fluidic communication between the fuel tank and a load port of the canister. In any or all of the preceding examples, additionally or optionally, the second condition includes a higher than threshold load in the fuel vapor canister, and wherein actuating the FTIV to the second position establishes fluidic communication between the fuel tank and a depressurization port of the canister, the load port positioned on a proximal end of the canister with a purge port, the depressurization port positioned on a distal end of the canister with a vent port. In any or all of the preceding examples, additionally or optionally, the method further comprises, during each of the first condition and second condition, upon completion of depressurization, actuating the FTIV to the first position, disengaging a refueling lock, and indicating degradation of the FTIV based on a pressure in the fuel tank during refueling. In any or all of the preceding examples, additionally or optionally, indicating degradation during depressurization includes, in response to a rate of pressure decay in the fuel tank during depressurization being lower than a first threshold rate, indicating the FTIV to be stuck in a third, closed position. In any or all of the preceding examples, additionally or optionally, indicating degradation during refueling includes, in response to a pressure in the fuel tank during refueling being lower than a threshold pressure, indicating the FTIV to be stuck in the second position, and in response to each of the rate of pressure decay in the fuel tank during depressurization being lower than a second threshold rate and the pressure in the fuel tank during refueling being higher than a threshold pressure, indicating the FTIV to be stuck in the first position.

In yet another example evaporative emissions system for a vehicle, comprises: a fuel tank including a pressure sensor, a fuel vapor canister having a load port coupled to a fuel tank via a first conduit, a depressurization port coupled to the fuel tank via a second conduit, a vent port coupled to atmosphere via a vent line, and a purge port coupled to an engine intake via a purge line, and a valve coupling the canister to the fuel tank, the valve actuatable between a first, second, and third position, and a controller with computer-readable instructions stored on non-transitory memory which when executed cause the controller to: responsive to operator actuation of a refueling button coupled to a vehicle dashboard and fuel tank pressure being higher than a first threshold pressure at the operator actuation, command the valve to the second position to depressurize the fuel tank by directing fuel tank vapors to the depressurization port of the canister along the second conduit when canister load is lower than a threshold load, and in response to a lower than first threshold change in pressure, indicate the valve stuck in the third, closed position. In any or all of the preceding examples, additionally or optionally, the controller includes further instructions to: upon pressure in the fuel tank decreasing to the threshold, command the valve to the first position and disable a refueling lock to enable refueling; and during refueling, in response to the fuel tank pressure being lower than a second threshold pressure, indicate the valve stuck in the second position. In any or all of the preceding examples, additionally or optionally, the controller includes further instructions to: in response to the valve being stuck in the second position, during the refueling, reduce a fill level in the fuel tank below a maximum fill level of the fuel tank.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine in a vehicle, comprising:

upon receiving a request for refueling, during a first condition, actuating a fuel tank isolation valve (FTIV) to a first position to depressurize a fuel tank via fuel vapor flow to a load port of a canister positioned on a first end of the canister, during a second condition, actuating the FTIV to a second position to depressurize the fuel tank via fuel vapor flow to a depressurization port of the canister positioned on a second end of the canister opposite the first end, during depressurization, indicating degradation of the FTIV based on a rate of pressure decay in the fuel tank, and in response to each of the rate of pressure decay in the fuel tank during depressurization being lower than a decay threshold rate and one or more premature shut-offs during refueling, indicating degradation of a cross over valve (COV) of an evaporative leak check module (ELCM) housed in a vent line.

2. The method of claim 1, wherein the first condition includes a lower than threshold load in a fuel vapor canister, and wherein actuating the FTIV to the first position establishes fluidic communication between the fuel tank and the load port of the canister.

3. The method of claim 1, further comprising, during each of the first condition and the second condition, upon completion of depressurization, actuating the FTIV to the first position, disengaging a refueling lock, and indicating degradation of the FTIV based on a pressure in the fuel tank during refueling.

4. The method of claim 3, wherein indicating degradation during depressurization includes, in response to the rate of pressure decay in the fuel tank during depressurization being lower than a first threshold rate, indicating the FTIV to be stuck in a third, closed position.

5. The method of claim 3, wherein indicating degradation during refueling includes, in response to a pressure in the fuel tank during refueling being lower than a threshold pressure, indicating the FTIV to be stuck in the second position, and, in response to each of the rate of pressure decay in the fuel tank during depressurization being lower than a second threshold rate and the pressure in the fuel tank during refueling being higher than a threshold pressure, indicating the FTIV to be stuck in the first position.

6. The method of claim 1, wherein the load port is positioned on the first end of the canister adjacent a purge port, the purge port connecting the canister to an intake, and wherein the depressurization port is positioned on the second end of the canister with a vent port, the vent port connecting the canister to atmosphere.

7. The method of claim 6, wherein a first buffer is positioned on the first end of the canister adjacent to the purge port and a second buffer is positioned on the second end of the canister adjacent to the depressurization port, and wherein a main body of the canister is located between the first and second buffers.

8. A method for an engine in a vehicle, comprising:

upon receiving a request for refueling, during a first condition, actuating a fuel tank isolation valve (FTIV) to a first position to depressurize a fuel tank, during a second condition, actuating the FTIV to a second position to depressurize the fuel tank, and during depressurization, indicating degradation of the FTIV based on a rate of pressure decay in the fuel tank, wherein the first condition includes a lower than threshold load in a fuel vapor canister, and wherein actuating the FTIV to the first position establishes fluidic communication between the fuel tank and a load port of the fuel vapor canister, wherein the second condition includes a higher than threshold load in the fuel vapor canister, and wherein actuating the FTIV to the second position establishes fluidic communication between the fuel tank and a depressurization port of the fuel vapor canister, the load port positioned on a proximal end of the fuel vapor canister with a purge port, and the depressurization port positioned on a distal end of the fuel vapor canister with a vent port, and in response to each of the rate of pressure decay in the fuel tank during depressurization being lower than a decay threshold rate and one or more premature shut-offs during refueling, indicating degradation of a cross over valve (COV) of an evaporative leak check module (ELCM) housed in a vent line.

9. The method of claim 8, further comprising, during the first condition, monitoring a pressure decay rate and indicating that the FTIV is stuck when the pressure decay rate is less than a pressure decay rate threshold.

10. The method of claim 8, wherein a first buffer is positioned on a first end of the fuel vapor canister adjacent to the purge port and a second buffer is positioned on a second end of the fuel vapor canister adjacent to the depressurization port, and wherein a main body of the canister is located between the first and second buffers, and wherein fuel vapors from the purge port flow into the first buffer and then the main body, and fuel vapors from the depressurization port flow into the second buffer and then the main body.

* * * * *